(12) United States Patent
Akagi et al.

(10) Patent No.: US 8,360,690 B2
(45) Date of Patent: Jan. 29, 2013

(54) METHOD OF REGULATING AIR-FOAM STABILIZER AND METHOD OF AIR-FOAM DRILLING WORK

(75) Inventors: Hirokazu Akagi, Tokyo (JP); Yoshimasa Kondo, Kamakura (JP); Kinji Imai, Nagoya (JP)

(73) Assignees: Wadeda University, Tokyo (JP); Maguma Co., Ltd., Kanagawa (JP); Taiyo Kiso Kogyo, Co., Ltd., Aichi (JP)

( * ) Notice: Subject to any disclaimer, the term of this patent is extended or adjusted under 35 U.S.C. 154(b) by 398 days.

(21) Appl. No.: 12/740,042

(22) PCT Filed: Aug. 7, 2008

(86) PCT No.: PCT/JP2008/064571
§ 371 (c)(1),
(2), (4) Date: Jun. 30, 2010

(87) PCT Pub. No.: WO2009/057367
PCT Pub. Date: May 7, 2009

(65) Prior Publication Data
US 2010/0266347 A1    Oct. 21, 2010

(30) Foreign Application Priority Data
Nov. 2, 2007 (JP) .................................. 2007-286732

(51) Int. Cl.
*E02D 5/18* (2006.01)
(52) U.S. Cl. ....................................................... 405/267
(58) Field of Classification Search ................... 405/267, 405/266, 263, 270, 302.4, 232, 233; 175/69
See application file for complete search history.

(56) References Cited

FOREIGN PATENT DOCUMENTS

| GB | 2 263 490 | 7/1993 |
|---|---|---|
| JP | 63-312418 | 12/1988 |
| JP | 5-202693 | 8/1993 |
| JP | 2768104 | 4/1998 |
| JP | 3124368 | 10/2000 |
| JP | 2001-329530 | 11/2001 |
| JP | 3725750 | 9/2005 |
| JP | 2006-45877 | 2/2006 |
| JP | 2007-2168 | 1/2007 |

OTHER PUBLICATIONS

International Search Report issued Sep. 16, 2008 in corresponding International Application No. PCT/JP2008/064571.
Hirokazu Akagi, "Kiho o Riyo shita Chichu Renzokukabe Kussakuyo Anteieki no Kaihatsu to Cost Hyoka", Kisoko, vol. 31, No. 7, Sougou Doboku Kenkyusho Co., Ltd., Jul. 15, 2003, pp. 22-25, Figs. 3-5, tables 2 and 3.

*Primary Examiner* — Thomas B Will
*Assistant Examiner* — Patrick Lambe
(74) *Attorney, Agent, or Firm* — Wenderoth, Lind & Ponack, L.L.P.

(57) ABSTRACT

Control indices in drilling work with an air-foam stabilizer are clarified for stabilizing and regulating the stabilizer on the basis of the following indices relating to the air foam amount and the water or cement milk amount in the stabilizer; and a method of regulation of the air-foam stabilizer based on these is provided.

<A> Defoaming water content ratio (Wmin) being the minimum water content at which when air foams are added to soil under drilling, defoaming would not occur, <B> Separation water content ratio (Wsep) being the maximum water content ratio at which any separation would not occur in the air-foam stabilizer, <C> Minimum air foam addition ratio (Qmin) exhibiting the minimum air foam addition amount from the viewpoint of the fluidity required for drilling, and <D> Maximum air foam addition ratio (Qmax) exhibiting the maximum air foam addition amount for obtaining the necessary density of the air-foam stabilizer as the minimum density required for drilling.

9 Claims, 10 Drawing Sheets

(To, Air-Foam Stabilizer, $Pw$=39.2, $Ps$=29.4)

(To, Bentonite Stabilizer, Pw=39.2, Ps=29.4)

Air-Foam Stabilizer Control Chart Model

METHOD OF REGULATING AIR-FOAM STABILIZER AND METHOD OF AIR-FOAM DRILLING WORK

TECHNICAL FIELD

The present invention relates to a method of regulating an air-foam stabilizer for drilling ground soil as mixed with air foams and water or cement milk, and to a method of air-foam drilling work based on it.

BACKGROUND ART

An underground continuous wall work method was employed in around 1950 in Europe as a work method for constructing an earth-retaining structure or a cut-off wall; and in Japan, in 1959, it was introduced for the first time for a cut-off wall for river stop. Afterwards, in construction works in and around urban areas, noise, vibration and neighboring land subsidence to occur in the work with steel sheet piles or precast piles, and the influence of the work on the ground water level are social problems; and the method is employed as an effective work method for such social/environmental problems. Recently, the method has become employed not only for deep underground and large-scale technologies but also for temporary structures and permanent structures. Further, use of the method is expanding not only for concrete structures but also for soil cement underground wall structures.

In such an underground continuous wall work method, a bentonite-base stabilizer is used for keeping the stabilization of the tunnel wall and facilitating sludge removal of drilled earth and sand. However, in the method, the amount of the sludge to be removed is large and, in addition, the sludge mixed with bentonite is difficult to reuse and requires a high cost for sludge disposal; and therefore, any one substitutable for it is desired.

On the other hand, it is known that a suspension of from 15 to 40% by volume of air foams and a suitable amount of water added to the soil under drilling (hereinafter referred to as an air-foam stabilizer) has various functions as a stabilizer, and that the underground continuous wall work method using the air-foam stabilizer does not specifically differ from the usual method. A necessary amount of air foams and water are jetted out through the drill tip of a drilling machine, and are mixed and stirred with the soil under drilling; and the suspension stabilizes the tunnel wall to be an air-foam stabilizer having the function of fluidity, etc., therefore enabling continuous drilling. The air foams in the removed sludge are left in air, or when a defoaming agent is added thereto, they readily disappear, and therefore, their post-treatment is easy. Accordingly, the sludge amount is reduced to at most ½ as compared with that with the bentonite-base stabilizer; and it may be said that the air-foam stabilizer is excellent in view of the environmental load and the economical aspect thereof.

As an example of using air foams in ground drilling, there is known an air-foam shield tunneling method (for example, Non-Patent Reference 1, Patent References 1-2). The air-foam shield tunneling method is a soil pressure shield tunneling method in which air foams are used as the slurry additive and in which air foam addition enhances the fluidity and the water stop security in removal of soil under drilling in a chamber and on a screw conveyor, and prevents adhesion of cohesive soil therein. The air foams in the removed soil spontaneously disappear or are defoamed by a defoaming agent, and therefore the removed soil is restored to the original state before air foam injection, and its post-treatment is easy. However, owing to the soil pressure inside the chamber that contains air foams therein, the mechanism to resist the shield face soil pressure is conceptually shown, but no detailed investigations have been made relating to the face ground stabilization mechanism by air foams themselves.

On the other hand, in the underground continuous wall work method (for example, Patent Reference 3) or the like, the air-foam stabilizer directly participates in the stability of the drilling tunnel wall like the bentonite-base stabilizer; and therefore, as compared with that in the air-foam shield case, the stabilization mechanism and performance of the stabilizer must be investigated in detail. In particular, the main material of the air-foam stabilizer is air foams, and therefore, the function expression mechanism of the stabilizer in the tunnel wall stabilization and the fluidity significantly differs from that of the bentonite-base stabilizer. Further, regarding the environmental load, the two significantly differ from each other in the sludge removal amount and the processing cost.

In the underground continuous wall work method using the bentonite-base stabilizer, the stabilizer is controlled using the stabilizer property control chart based on the measured data of the specific gravity and the funnel viscosity thereof; and many excellent work results have been obtained. Within a predetermined region of the control chart, the bentonite stabilizer keeps good or somewhat good properties; however, in a case where the state changes to the area outside the region, it is said necessary to take some suitable measures of increasing the amount of bentonite or adding a promoter such as CMC or the like.

The air-foam stabilizer has been invented on the basis of the above-mentioned already-existing knowledges and techniques, and is defined as "a stabilizer which is a homogeneous suspension of soil under drilling, air foams and water and which is excellent in tunnel wall stabilization, water-stop performance and fluidity". However, the physical properties of the air-foam stabilizer are greatly influenced not only by the amount of the foams to be added and the amount of water but also by the grain size and the consistency characteristic of the soil under drilling. Therefore, in underground drilling with the air-foam stabilizer, suitable control indices capable of evaluating their influences, corresponding to the specific gravity and the funnel viscosity of the bentonite stabilizer, must be provided for drilling control of regulating the amount of the foams and water to be added.

At present, however, any technical means relating to the control indication for the drilling work with the air-foam stabilizer is, in fact, as yet not realized.

Non-Patent Reference 1: the Shield Technology Association, "Air-Foam Shield Work Method" (June 2007)

Patent Reference 1: Japanese Patent No. 3124368

Patent Reference 2: Japanese Patent No. 2768104

Patent Reference 3: Japanese Patent No. 3725750

In the above-mentioned background, an object of the present invention is to solve the prior-art problems and clarify the control indices in the drilling work with an air-foam stabilizer, thereby providing a method for regulating an air-foam stabilizer based on these and providing a novel method for ground drilling.

DISCLOSURE OF THE INVENTION

For solving the above-mentioned problems, the invention is characterized by the following:

First: A method for regulating an air-foam stabilizer for ground drilling by adding air foams and water or cement milk to soil under drilling and mixing them, wherein the air foam amount and the water or cement milk amount are controlled for stabilization on the basis of the following indices:

<A> Defoaming water content ratio (Wmin) being the minimum water content at which when air foams are added to soil under drilling, defoaming would not occur, <B> Separation water content ratio (Wsep) being the maximum water content ratio at which any separation would not occur in the air-foam stabilizer, <C> Minimum air foam addition ratio (Qmin) exhibiting the minimum air foam addition amount from the viewpoint of the fluidity required for drilling, and <D> Maximum air foam addition ratio (Qmax) exhibiting the maximum air foam addition amount for obtaining the necessary density of the air-foam stabilizer as the minimum density required for drilling.

Second: The method for regulating an air-foam stabilizer of the above first, wherein in an orthogonal X-Y two-dimensional correlation diagram of the density and the fluidity of the air-foam stabilizer, the air foam amount, and the water or cement milk amount are controlled so as to fall within the range surrounded by the curves of the above-mentioned indices Wmin, Wsep, Qmin and Qmax.

Third: The method for regulating an air-foam stabilizer of the above second, wherein the density and the fluidity of the air-foam stabilizer are expressed by the weight per volume, $\gamma c$ of the air-foam stabilizer and the TF value thereof.

Fourth: The method for regulating an air-foam stabilizer of any of the above first to third, wherein the defoaming water content ratio Wmin is determined based on the sum of the surface dry water content ratio of the coarse grains in the soil under drilling and the shrinkage limit water content ratio of the fine grains therein.

Fifth: The method for regulating an air-foam stabilizer of any of the above first to fourth, wherein the separation water content ratio (Wsep) is the sum of the separation water content ratio of the coarse grains in the soil under drilling and the separation water content ratio of the fine grains therein, and wherein the separation water content ratio of the coarse grains is expressed as the linear function of the specific surface area of the coarse grains and the air foam addition ratio of the air-foam stabilizer, and the separation water content ratio of the fine grains is expressed as the liquid limit.

Sixth: The method for regulating an air-foam stabilizer of any of the above first to fifth, wherein the TF value is controlled as the function of the water content ratio W, the air foam addition ratio Q, the specific surface area S of the coarse grains of the soil under drilling, the fine grain content ratio P in the soil under drilling, and the liquid limit $W_L$ of the fine grains of the soil under drilling, in every four regions where the fine grain content ratio P of the soil under drilling is at least 10%, or less than 10%, and the air foam addition ratio thereof is at least 1%, or less than 1%.

Seventh: The method for regulating an air-foam stabilizer of any of the above first to sixth, wherein the minimum air foam addition ratio (Qmin) is determined as the index that indicates the necessary air foam amount for maintaining the TF value to be not lower than the control level when the water content ratio W is the defoaming water content ratio (Wmin).

Eighth: The method for regulating an air-foam stabilizer of any of the above first to seventh, wherein the weight per volume $\gamma c$ of the stabilizer is controlled as the function of the air foam addition ratio Q, the fine grain content ratio P, the water content ratio W of the stabilizer, the weight per volume $\gamma ss$ of the soil grains of the coarse grains, the weight per volume $\gamma sc$ of the soil grains of the fine grains, the weight per volume $\gamma w$ of water, and the weight per volume $\gamma b$ of the air foams, and the maximum air foam addition amount (Qmax) is determined as the necessary air foam amount for maintaining $\gamma c$ to be not lower than the control level along with the separation water content ratio Wsep.

Ninth: The air-foam drilling work method of any of the above first to eighth, wherein the cement milk has a water to cement ratio (W/C) of from 0.6 to 4.0.

Tenth: An air-foam drilling work method of drilling a ground with regulating the air-foam stabilizer according to the method of any of the above first to ninth.

Eleventh: The air-foam drilling work method of the above tenth, which is an underground continuous wall work method of preventing the breakdown of tunnel walls and facilitating the removal of sludge.

Twelfth: The air-foam drilling work method of the above eleventh, wherein in solidifying the air-foam stabilizer, a defoaming material is mixed in the solidifying material for increasing the strength of the solidified material.

Thirteenth: The air-foam drilling work method of the above tenth, which is a shield work method of filling the air-foam stabilizer between the cutter face of a shield propeller and the cutting face and in the chamber, and drilling the ground with preventing the breakdown of the cutting face.

BEST MODE FOR CARRYING OUT THE INVENTION

Figure 1:
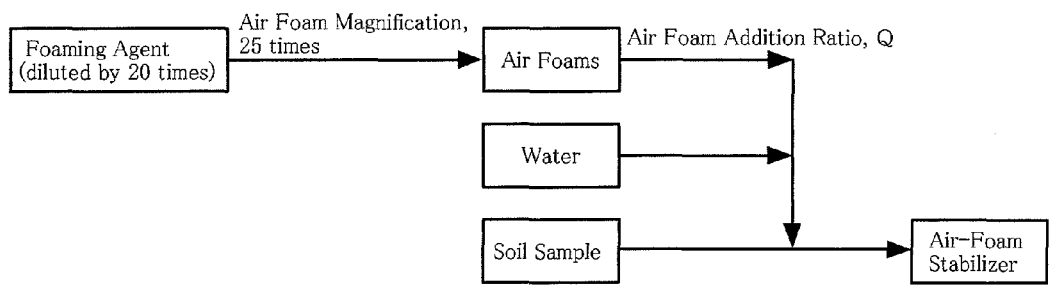
FIG. 1 is a flowchart of illustrating a method of producing an air-foam stabilizer.

The air-foam stabilizer of the invention is continuously produced by adding air foams and water or cement milk to soil under drilling, and mixing and kneading them, and it exhibits a stable effect as a homogeneous suspension in drilling work. In the invention, as a regulation method of enabling the production of such an air-foam stabilizer continuously in the work field, the air foam addition amount and the water or cement milk addition amount are controlled on the basis of the above-mentioned indices of:

<A> Defoaming water content ratio (Wmin) being the minimum water content at which when air foams are added to soil under drilling, defoaming would not occur, <B> Separation water content ratio (Wsep) being the maximum water content ratio at which any separation would not occur in the air-foam stabilizer, <C> Minimum air foam addition ratio (Qmin) exhibiting the minimum air foam addition amount from the viewpoint of the fluidity required for drilling, and <D> Maximum air foam addition ratio (Qmax) exhibiting the maximum air foam addition amount for obtaining the necessary density of the air-foam stabilizer as the minimum density required for drilling. These indices were concretely clarified for the first time in the present invention.

In the regulation method of the invention, as described in the above, the air foam amount, and the water or cement milk amount are controlled so as to fall within the range surrounded by the curves of the above-mentioned indices Wmin, Wsep, Qmin and Qmax, in an orthogonal X-Y two-dimensional correlation diagram of the density and the fluidity of the air-foam stabilizer.

The reasons and the grounds for the effectiveness of the above-mentioned indices group in regulation and control of the air-foam stabilizer are described in detail hereinunder.

1. Indices Group and Physical Properties of Air-Foam Stabilizer:

In the following description, the following are the premises for concrete verification:

(1) Regarding Materials:

<Foaming Agent>

As the foaming agent, use of various alkylsulfate surfactants, partially-hydrolyzed proteins, alkyl ether compound complexes and the like may be taken into consideration. Above all, for exerting the property of retaining tunnel wall stabilization that is the most necessary function for the stabilizer, preferred is use of alkylsulfate surfactants as the foaming agent difficult in deforming and excellent in chemical stability to acids, alkali and others and having a large foaming capability.

The foaming agent used in the following verification is a commercial product used for air-foam concrete, air mortar, etc. So far as the grain size of the air foams to be obtained falls within a range of from about 20 to 500 μm or so, the foaming agent may be used like in the following verification.

<Soil Sample for Test>

As the soil samples of simulated soils, used were Toyoura sand, silica sand No. 6, silica sand No. 5, silica sand No. 4, silica sand No. 3 and NS30 as coarse grain soil, and kaolin, kibushi clay and bentonite differing from each other in the consistency characteristic as fine grain soil; and the coarse grain soil and the fine grain soil were suitably mixed to prepare samples. In the explanatory notes to the drawings to be mentioned below, the samples are expressed by the codes given thereto as in Table 1. The mixed soil of coarse grain soil and fine grain soil is expressed by hyphenation such as To-Ka. $D_{50}$ means a 50% grain size of the sample; S means a specific surface area; $W_L$ means a liquid limit; Ip means a plasticity index.

TABLE 1

Soil Symbols and Basic Properties

| Classification | Soil Name | Code | Physical Properties |
|---|---|---|---|
| Coarse Grain Soil | Toyoura Sand | To | $D_{50}$ = 0.188 mm, S = 1236 m²/kN |
| | Silica Sand No. 6 | K6 | $D_{50}$ = 0.334 mm, S = 639 m²/kN |
| | Silica Sand No. 5 | K5 | $D_{50}$ = 0.517 mm, S = 451 m²/kN |
| | Silica Sand No. 4 | K4 | $D_{50}$ = 0.941 mm, S = 248 m²/kN |
| | Silica Sand No. 3 | K3 | $D_{50}$ = 1.494 mm, S = 156 m²/kN |
| | NS30 | NS30 | $D_{50}$ = 1.361 mm, S = 172 m²/kN |
| Fine Grain Soil | Kaolin | Ka | $W_L$ = 44.6%, $I_P$ = 27.0 |
| | Kibushi Clay | Ki | $W_L$ = 62.0%, $I_P$ = 36.5 |
| | Bentonite | Be | $W_L$ = 331.4%, $I_P$ = 321.4 |

<Production of Air-Foam Stabilizer>

Herein the air-foam stabilizer is first investigated for the case where air foams and water are added to soil under drilling. Another case where cement milk is added in place of water is described later.

For the method of producing an air-foam stabilizer, referred to is FIG. 1, in which a foaming agent stock solution is diluted by 20 times with water in accordance with the specification, then foamed with a hand mixer into foams having a volume of 25 times; and the foams and water are added to the sample soil, and mixed so that the sample soil, the foams and water could uniformly disperse. The dilution rate of the foaming agent is the dilution rate prescribed in the specification of the foaming agent. In case where a foaming agent having a different specification is used, the dilution rate at which the foaming agent could maximize its function is employed, and the foam addition ratio Q and the foam weight per volume γb to be mentioned below may be thereby controlled.

The foam addition ratio Q to the air-foam stabilizer is defined by the formula (1). As obvious from the formula (1), the air foam addition ratio Q is defined as the ratio of the foam weight to the dry weight of the soil under drilling. The air foam addition amount is the weight of the air foams relative to the dry weight of the soil under drilling.

[Numerical Formula 1]

$$Q(\%) = (\text{weight of 20-time diluted foaming agent, g}) / (\text{dry weight of soil under drilling, g}) \times 100 \quad (1)$$

(2) Condition for Suspension Stability of Air-Foam Stabilizer:

In case where the water content ratio of the soil under drilling to be mixed with air foams is suitable, then the air-foam stabilizer could be stable in suspension; but when the soil under drilling is in a dry state, then water in the air foams are adsorbed by the soil grains owing to the water-absorbing action thereof, thereby causing defoaming. Contrary to this, when the water addition amount increases and the water content ratio is high, then the soil grains cause separation and precipitation and the air-foam stabilizer becomes an inhomogeneous state. When the minimum water content ratio at which foams do not disappear is called a defoaming water content ratio, and the water content ratio at which soil grains separate and precipitate is called separation water content ratio; then they may be defined as follows. The soil grains referred to herein are meant to indicate all the soil grains of coarse grains and fine grains in the soil under drilling.

<Defoaming Water Content Ratio (Wmin)>

Figure 2:
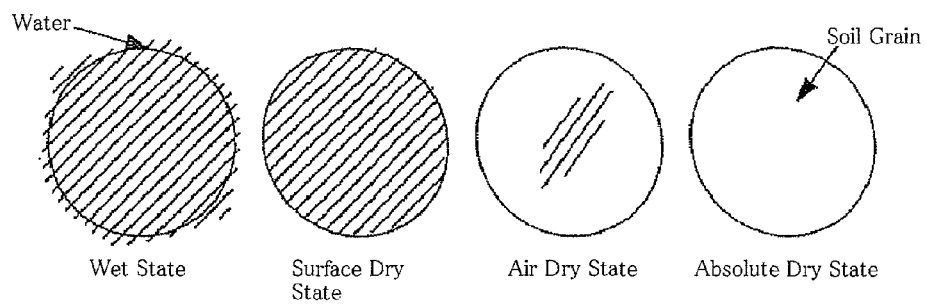
FIG. 2 is a graphic view showing a water-containing condition of an aggregate soil grain.

The minimum water content ratio at which the air-foam stabilizer does not defoam is designated as the defoaming water content ratio (Wmin). The influence of the difference in the properties of the soil grains contained in the air-foam stabilizer on the defoaming water content ratio is investigated for the coarse grains and the fine grains divided in the soil grains contained in the stabilizer.

a) Influence of Coarse Grains:

The influence of the coarse grains on the defoaming water content ratio was evaluated with taking particular note of the surface dry condition water content ratio used in planning the aggregate formulation of concrete. In concrete engineering, the moisture stage of aggregate soil grains is divided into 4 levels as in FIG. 2, in which the defoaming phenomenon may occur through adsorption of air foams by the soil grains when the water content ratio is lower than the surface dry condition. Accordingly, for the coarse grains, the defoaming water content ratio could be the water content ratio corresponding to the surface dry condition (surface dry water content ratio).

b) Influence of Fine Grains:

Regarding the fine grains, it is difficult to measure the surface dry water content ratio thereof. Accordingly, attention was focused on the volume shrinkage state resulting from the water content ratio reduction in the fine grains such as clay. With the reduction in the water content ratio thereof, the fine grains shrink in a process of regular shrinkage, residual shrinkage and zero shrinkage. In zero shrinkage, the skeleton volume of the soil grains does not change but only the pore liquid volume reduces. Accordingly, it is considered that the fine grains would adsorb air foams and defoam them when the water content ratio is lower than the ratio corresponding to the shrinkage limit at which the residual shrinkage stops. Therefore, for the fine grains, a water content ratio corresponding to the shrinkage limit (shrinkage limit water content ratio) may be employed for the defoaming water content ratio.

c) Determination of Defoaming Water Content Ratio (Wmin) of Air-Foam Stabilizer:

In consideration of the influence of the coarse grains and the fine grains contained in the air-foam stabilizer on the defoaming condition, the defoaming water content ratio for the soil under drilling is determined. If air foams could not be adsorbed by the soil grains and therefore could not disappear, at least a water content corresponding to the surface dry condition of the coarse grains and a water content corresponding to the shrinkage limit of the fine grains must exist in the soil under drilling that is composed of the coarse grains and the fine grains. In consideration of the contribution of the fine grains and the coarse grains, the sum of the water contents is expressed as the water content ratio to all the soil, and the defoaming water content ratio (Wmin) of the soil under drilling is defined by the following formula (2):

[Numerical Formula 2]

$$W\text{min} = (\text{surface dry water content ratio}) \times (100-P)/100 + (\text{shrinkage limit water content ratio}) \times P/100 \quad (2)$$

In this, Wmin is a defoaming water content ratio (%), and P is a fine grain content ratio (%). The surface dry water content ratio of five types of silica sands not containing fine grains was measured, and the average was 6.97%.

On the other hand, the shrinkage limit water content ratio of ordinary soil composed of fine grains is as shown in Table 2. The average surface dry water content ratio, 6.97% and the shrinkage limit water content ratio of ordinary clay, 11.0% are assigned to the above formula (2), thereby leading to the following formula 3.

TABLE 2

| Shrinkage Limit Water Content Ratio (%) of Ordinary Soil | | | | | | |
|---|---|---|---|---|---|---|
| sand | silt | clay | colloid | mica | peat | kaolin |
| — | 19 | 11 | 6 | 160 | 44 | 36 |

[Numerical Formula 3]

$$W\text{min} = 6.97 + 0.0403P \quad (3)$$

<Separation Water Content Ratio (Wsep)>

When water is gradually added to the air-foam stabilizer in which soil grains, water and air foams are dispersed in a stable suspension state, then the suspension state is broken and the soil grains begin to precipitate at a certain water content ratio. The water content ratio at which the suspension state is broken is the separation water content ratio (Wsep).

Figure 3:
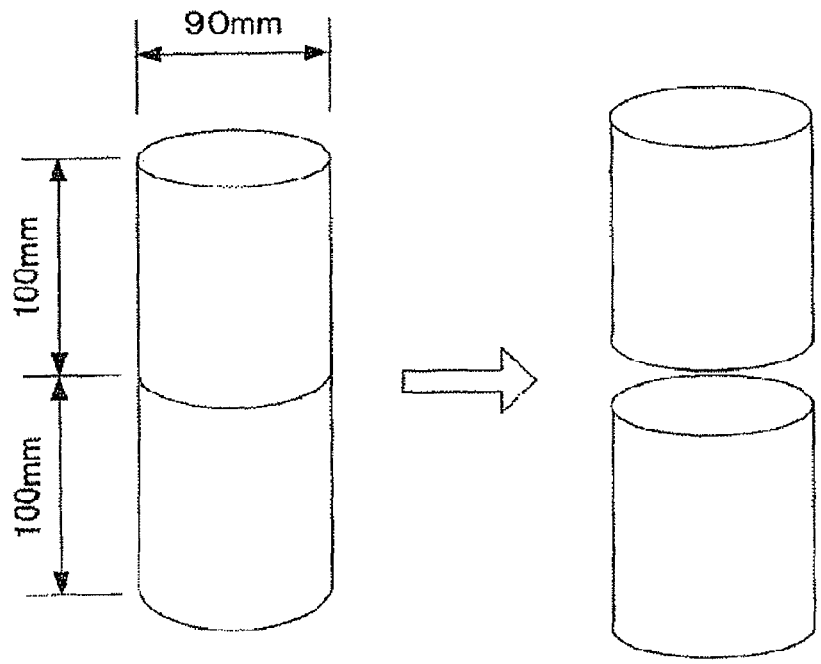
FIG. 3 is a graphic view showing a cylindrical separation water content ratio-measuring device used in a separation experiment.

In the separation experiment to determine the separation water content ratio, used was a cylindrical separation water content ratio-measuring device that could be divided into two, upper and lower portions as in FIG. 3 (inner diameter 90 mm, height 200 mm). An air-foam separator is filled in the separation water content ratio-measuring device, and its weight is metered, and thereafter this is statically kept. After 1 hour, the upper layer container and the lower layer container are carefully divided, and the weight of the lower layer is metered, and the weight per volume of the air-foam stabilizer in the upper and lower containers is metered. The ratio of the weight per volume of the upper and lower air-foam stabilizers is expressed by the weight ratio of the formula (4). In case where the soil grains separate and precipitate in the air-foam stabilizer, the weight per volume of the lower container is large, and therefore the weight ratio increases. Accordingly, the water content ratio at which the weight ratio suddenly increases is the separation water content ratio.

[Numerical Formula 4]

$$\text{Ratio by Weight} = (\text{weight per volume of the air-foam stabilizer in the lower container})/(\text{weight per volume of the air-foam stabilizer in the upper container}) \quad (4)$$

a) Influence of Coarse Grains:

For the factors having an influence on the separation water content ratio, the water content ratio W of the air-foam stabilizer, the air foam addition ratio Q, the specific surface area S of the coarse grains in the soil under drilling (hereinafter referred to as specific surface area), the fine grain content ratio P, and the liquid limit $W_L$ are specifically noted, and these influences are confirmed in experiments thereby giving an estimated formula of the separation water content ratio.

Figure 4:
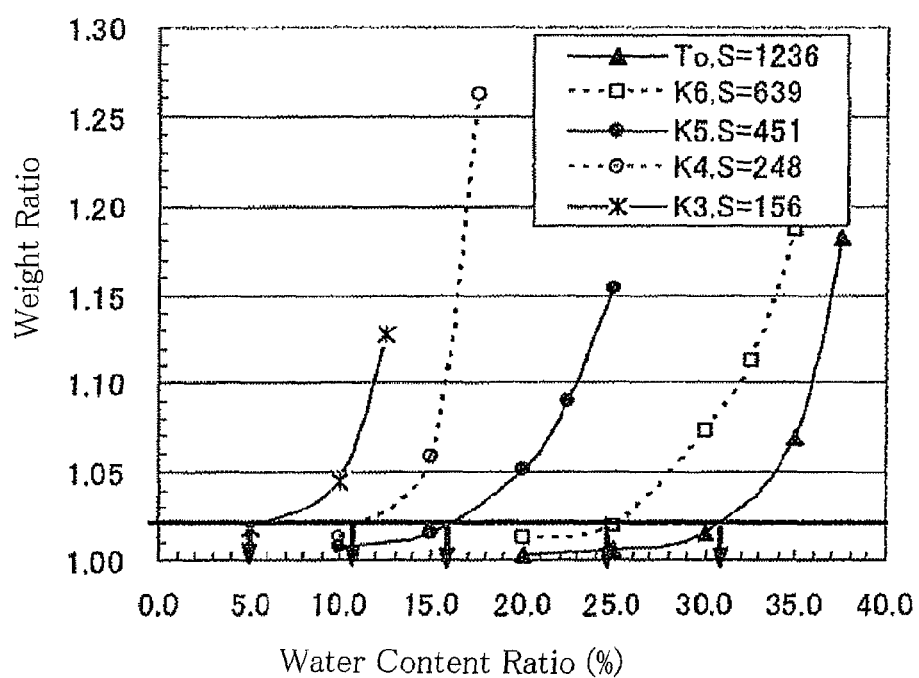
FIG. 4 is a result of checking the influence of the specific surface area of the coarse grains in soil under drilling, for which air-foam stabilizers were produced with various types of silica sand in Table 1 having a constant air foam addition ratio, 2% and having a varying water content ratio, and the weight ratio was determined.

First, for checking the influence of the specific surface area of the coarse grains in soil under drilling, air-foam stabilizers were produced with various types of silica sand in Table 1 having a constant air foam addition ratio, 2% and having a varying water content ratio, and the weight ratio was determined. The results are shown in FIG. 1. In the explanatory notes to the drawing, S means the specific surface area (m²/kN) of each sample According to FIG. 4, it is known that, of every sample, when the weight ratio is more than about 1.02, then the weight ratio thereof suddenly increases and the air-foam stabilizer is separated. The water content ratio corresponding to the weight ratio of 1.02 is read on the drawing, and this is the separation water content ratio (Wsep). The separation water content ratio of Toyoura sand is 31.0%, that of silica sand No. 6 is 25.0%, that of silica sand No. 5 is 16.5%, that of silica sand No. 4 is 11.5%, and that of silica sand No. 3 is 6.0%. From these, it is known that the specific surface area of the soil grains and the separation water content ratio are proportionate to each other. This may be because the soil grains having a larger specific surface area would be more influenced by the buoyancy of air foams owing to the adhesion force between the soil grains and the air foams.

With the 50% grain size of the coarse grains, the specific surface area was computed according to the formula (5).

[Numerical Formula 5]

$$S = 6/\gamma_s D_{s50} \qquad (5)$$

In this, S means the specific surface area (m²/kN) of the coarse grains; $D_{s50}$ means the 50% grain size (m) of the coarse grains; γs means the weight per volume (kN/m³) of the coarse grains.

Further, for checking the influence of the air foam addition ratio, samples were prepared with varying the air foam addition ratio Q in a range of from 0 to 10% in Toyoura sand, silica sand No. 6 and silica sand No. 5, and were analyzed for the separation water content ratio. The results are shown in Table 3.

Regarding the influence of the coarse grains, the data of the soil samples not containing fine grains in Table 3 (factor division, S and Q) were processed for multiple linear regression analysis with the specific surface area and the air foam addition ratio taken as the variables.

[Numerical Formula 6]

$$W\text{sep}1 = 0.0253S + 1.17Q + 1.07 \qquad (6)$$

In this, Wsep1 means the separation water content ratio (%) of the coarse grains, S means the specific surface area (m²/kN), and Q means the air foam addition ratio (%).

b) Influence of Fine Grains:

Next, for checking the influence of the fine grain content ratio in the soil under drilling, samples prepared by adding kaolin to various types of silica sand in a ratio by weight falling within a range of from 0 to 40% were used to produce air-foam stabilizers in which the air foam addition ratio was 2% and the water content was varied. Also in these cases, the separation rapidly occurred when the weight ratio reached around 1.02; and therefore, the water content ratio corresponding to the weight ratio of 1.02 was obtained to be the separation water content ratio (Wsep). The results are shown in Table 3.

Samples prepared by adding different types of clay differing from each other in the consistency characteristic (kaolin, kibushi clay, bentonite) to Toyoura sand were used, and the separation water content ratio of those samples where the air foam addition ratio Q is almost 2% was determined. The data are shown in Table 3. The liquid limit and the separation water content ratio are proportionate to each other; and it is considered that, since the clay having a higher liquid limit could increase more the viscosity of the air-foam stabilizer containing it, separation could hardly occur in the stabilizer.

TABLE 3

| | | Found Data and Estimated Data of Separation Water Content Ratio | | | | | |
|---|---|---|---|---|---|---|---|
| | | Specific Surface | Fine Grain Content | Liquid Limit | Air Foam Addition | Separation Water Content Ratio Wsep (%) | |
| Factor Division | Sample | Area (m²/KN) | ratio P (%) | $W_L$ (%) | Ratio Q (%) | Found Data | Estimated Data |
| S | Toyoura Sand | 1,236 | 0 | 0.0 | 2.0 | 31.0 | 33.7 |
| | Silica sand No. 6 | 699 | 0 | 0.0 | 2.0 | 25.0 | 20.5 |
| | Silica sand No. 5 | 451 | 0 | 0.0 | 2.0 | 16.5 | 14.4 |
| | Silica sand No. 4 | 248 | 0 | 0.0 | 2.0 | 11.5 | 9.4 |
| | Silica sand No. 3 | 156 | 0 | 0.0 | 2.0 | 6.0 | 7.2 |
| P | Toyoura sand + kaolin | 1,236 | 7.5 | 44.6 | 2.0 | 35.0 | 37.7 |
| | Toyoura sand + kaolin | 1,236 | 15.0 | 44.6 | 2.0 | 46.0 | 40.4 |
| | Toyoura sand + kaolin | 1,236 | 20.0 | 44.6 | 1.6 | 45.0 | 41.7 |
| | Toyoura sand + kaolin | 1,236 | 30.0 | 44.6 | 1.4 | 42.0 | 45.0 |
| | Toyoura sand + kaolin | 1,236 | 40.0 | 44.6 | 2.0 | 47.0 | 49.3 |

TABLE 3-continued

Found Data and Estimated Data of Separation Water Content Ratio

| Factor Division | Sample | Specific Surface Area (m²/KN) | Fine Grain Content ratio P (%) | Liquid Limit $W_L$ (%) | Air Foam Addition Ratio Q (%) | Separation Water Content Ratio Wsep (%) | |
|---|---|---|---|---|---|---|---|
| | | | | | | Found Data | Estimated Data |
| $W_L$ | Silica sand No. 6 + kaolin | 699 | 10.0 | 44.6 | 2.0 | 20.0 | 25.4 |
| | Silica sand No. 4 + kaolin | 248 | 15.0 | 44.6 | 2.0 | 18.0 | 16.1 |
| | Silica sand No. 3 + kaolin | 156 | 20.0 | 44.6 | 1.6 | 15.0 | 15.1 |
| | Toyoura sand + kibushi clay | 1,236 | 15.0 | 62.0 | 1.7 | 35.0 | 40.5 |
| | Toyoura sand + bentonite | 1,236 | 2.5 | 331.4 | 2.0 | 35.0 | 44.6 |
| | Toyoura sand + bentonite | 1,236 | 10.0 | 331.4 | 2.0 | 43.0 | 47.3 |
| | Toyoura sand + bentonite | 1,236 | 15.0 | 331.4 | 1.7 | 64.0 | 48.7 |
| Q | Toyoura Sand | 1,236 | 0 | 0.0 | 0.5 | 30.0 | 31.8 |
| | Toyoura Sand | 1,236 | 0 | 0.0 | 1.0 | 30.0 | 32.4 |
| | Toyoura Sand | 1,236 | 0 | 0.0 | 2.0 | 35.0 | 33.7 |
| | Toyoura Sand | 1,236 | 0 | 0.0 | 4.0 | 42.5 | 36.2 |
| | Toyoura Sand | 1,236 | 0 | 0.0 | 8.0 | 43.0 | 41.3 |
| | Toyoura Sand | 1,236 | 0 | 0.0 | 10.0 | 50.0 | 43.9 |
| | Silica sand No. 5 | 451 | 0 | 0.0 | 4.0 | 22.0 | 17.0 |
| | Silica sand No. 6 | 699 | 0 | 0.0 | 8.0 | 14.0 | 28.1 |

The soil containing fine grains becomes fluid at the liquid limit thereof, and therefore begins to separate. Further, when air foams enter it, the separation would be thereby augmented. The data of the samples containing fine grains in Table 3 (factor division, Q and $W_L$) were processed for multiple linear regression analysis with the liquid limit and the air foam addition ratio taken as variables. As a result, the significance of the liquid limit was judged high, and therefore the separation water content ratio of the fine grains was the liquid limit. Physically, the liquid limit of being the water content ratio at which the fine grains change from the plastic state to the liquid state is considered to govern the reduction in the separation of the air-foam stabilizer.

[Numerical Formula 7]

$$Wsep2 = W_L \quad (7)$$

In this, Wsep2 means the separation water content ratio (%) of the fine grains, and $W_L$ means the liquid limit (%).

c) Determination of Separation Water Content Ratio of Air-Foam Stabilizer:

The separation water content ratio of the air-foam stabilizer is represented by the formula (8) in which the sum of the water content data corresponding to the separation water content ratio of coarse grains and fine grains like the minimum water content ratio are expressed as the water content ratio to all soils.

[Numerical Formula 8]

$$Wsep = Wsep1 \frac{100-P}{100} + Wsep2 \frac{P}{100} \quad (8)$$
$$= (0.0253S + 1.17Q + 1.07)\frac{100-P}{100} + W_L\frac{P}{100}$$

Figure 5:
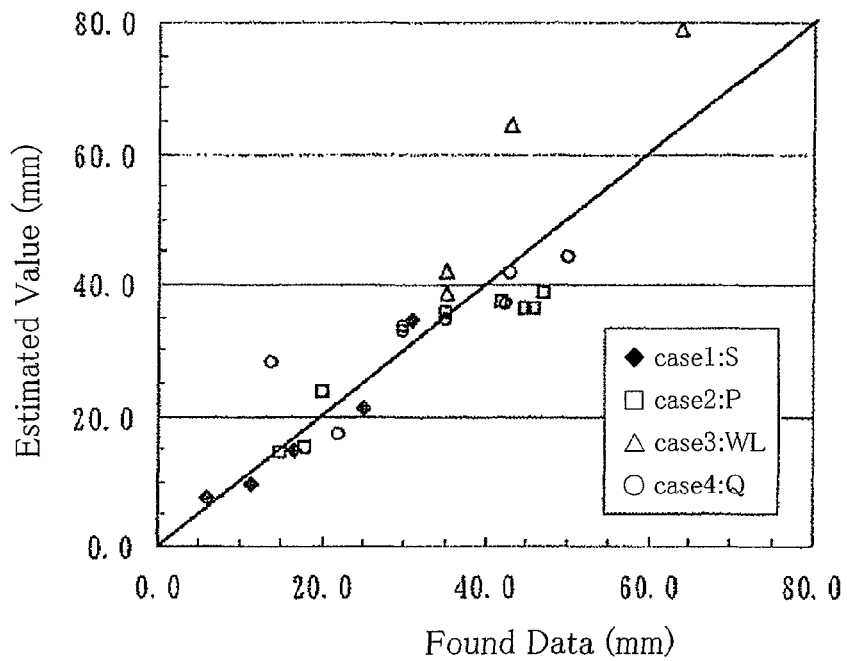
FIG. 5 is a result of comparison of the computed data of the separation water content ratio and the estimated data from the formula (8) thereof, in different factors.

The results of comparison between the found data and the estimated data according to the formula (8) of the separation water content ratio, as compared for different factors, are shown in FIG. 5. In this, though the data fluctuate in some degree, it may be considered that the water separation content ratio could be determined with no problem according to the formula (8) or according to the formula derived from a process similar to the above process, within the water content ratio of from 5(%) to 50(%) assumed in an actual ground.

(3) Requirement for Tunnel Wall Stability with Air-Foam Stabilizer:

The impermeable layer to be formed on the tunnel wall by the stabilizer for drilling plays an important roll of preventing the breakdown of the tunnel wall by preventing water leakage and by transmitting the liquid pressure to the tunnel wall. With the bentonite-base stabilizer, the bentonite clay film formed on the tunnel wall surface plays the role of the impermeable layer. On the other hand, with the air-foam stabilizer, the air foams would penetrate into the pores of the original ground around them and integrate with the unsaturated soil grain skeleton to form the impermeable layer having a thickness of a few times that of the bentonite clay film.

The control result in the field with a bentonite-base stabilizer, and the situation of forming an impermeable layer with an air-foam stabilizer and a bentonite-base stabilizer and the impermeability performance of the layer were compared experimentally, and the function expression mechanism of the air-foam stabilizer and the requirement for the tunnel wall stability were investigated.

a) Weight Per Volume of Air-Foam Stabilizer:

The weight per volume γc of the air-foam stabilizer composed of the soil grains (coarse grains, fine grains) of the soil under drilling, air foams and pore water is represented by the formula (9).

[Numerical Formula 9]

$$\gamma_C = \frac{W_s + W_w + W_b}{V_s + V_w + V_b} \quad (9)$$
$$= \frac{100 + w + Q}{\frac{100-P}{\gamma_{ss}} + \frac{P}{\gamma_{sc}} + \frac{w}{\gamma_w} + \frac{Q}{\gamma_b}}$$

In this, γc means the weight per volume (kN/m³) of the air-foam stabilizer, Ws, Ww and Wb each mean the weight (kN) of the soil grains, the pore water and the air foams, respectively; Vs, Vw and Vb each mean the volume (m³) of the soil grains, the pore water and the air foams, respectively; γss and γsc each mean the weight per volume (kN/m³) of the coarse soil grains and the fine soil grains, respectively; γw and γb each mean the weight per volume (kN/m³) of water and the air foams, respectively; w means the water content ratio (%); P means the fine grain content ratio (%); Q means the air foam addition ratio (%).

Figure 6:
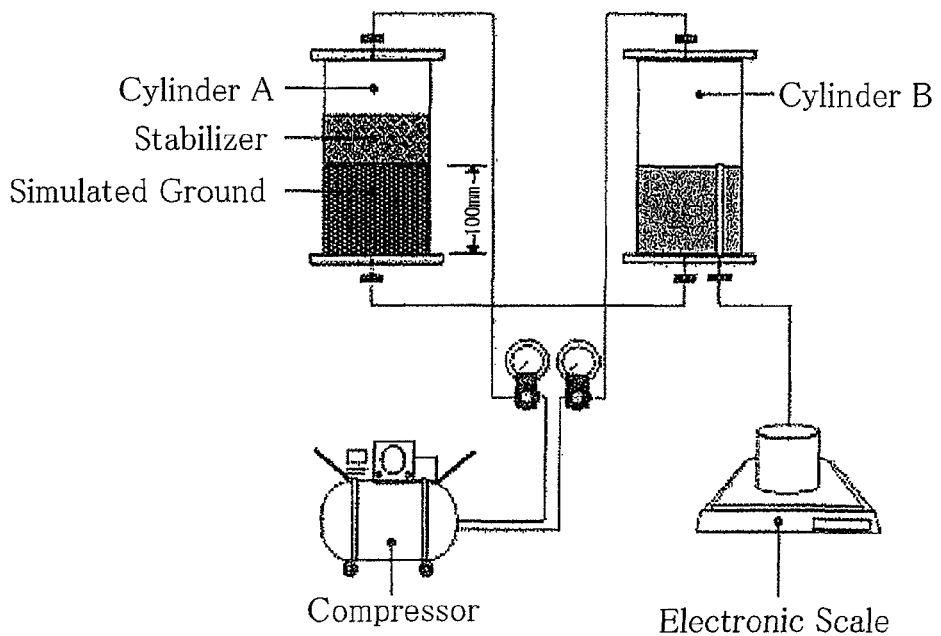
FIG. 6 is a view of an experimental apparatus used in the experiment according to a falling head permeability test.

The weight per volume of the stabilizer necessary for keeping the stability of a tunnel wall could be at least 10.3 (kN/m³) corresponding to the minimum value of the specific gravity, 1.05 in the property control chart of the bentonite-base stabilizer. With this value and the formula (9), an inequality expression which the air foam addition ratio Q and the water content ratio W of the air-foam stabilizer using a specific soil for drilling should satisfy is determined b) Impermeable Layer Forming Situation and Impermeability Performance:

For checking the situation of forming an impermeable layer with an air-foam stabilizer and a bentonite-base stabilizer, an experiment for a falling head permeability test was carried out using an experimental apparatus shown in FIG. 6.

The test procedure is as follows: Soil samples were Toyoura sand, silica sand No. 7, silica sand No. 6, silica sand No. 5 and silica sand No. 4. An air-foam stabilizer with γc=10.3 (kN/m³), and a bentonite stabilizer with γc=10.3 (kN/m³) and with a funnel viscosity of 24.5 sec were used. The air-foam stabilizer was so regulated as to have the intended γc by adding air foams to each sample in a saturated state to thereby change the air foam addition amount therein, with the assumption of an actual drilling situation. The soil sample was first put into the cylinder A to a height of 10 cm, as divided in 3 layers and tamped down, thereby forming a simulated ground. The water level in the cylinder B was made the same as the height of the simulated ground in the cylinder A, and the simulated ground was saturated. Next, the air-foam stabilizer or the bentonite stabilizer was poured onto the simulated ground, then an air pressure of 19.6 (kN/m³) corresponding to a hydraulic head of 200 cm was applied to the top of the cylinder A, and the water permeation amount per unit time to flow out from the cylinder B was metered at every 1 second until the amount reached constant.

Figure 7:
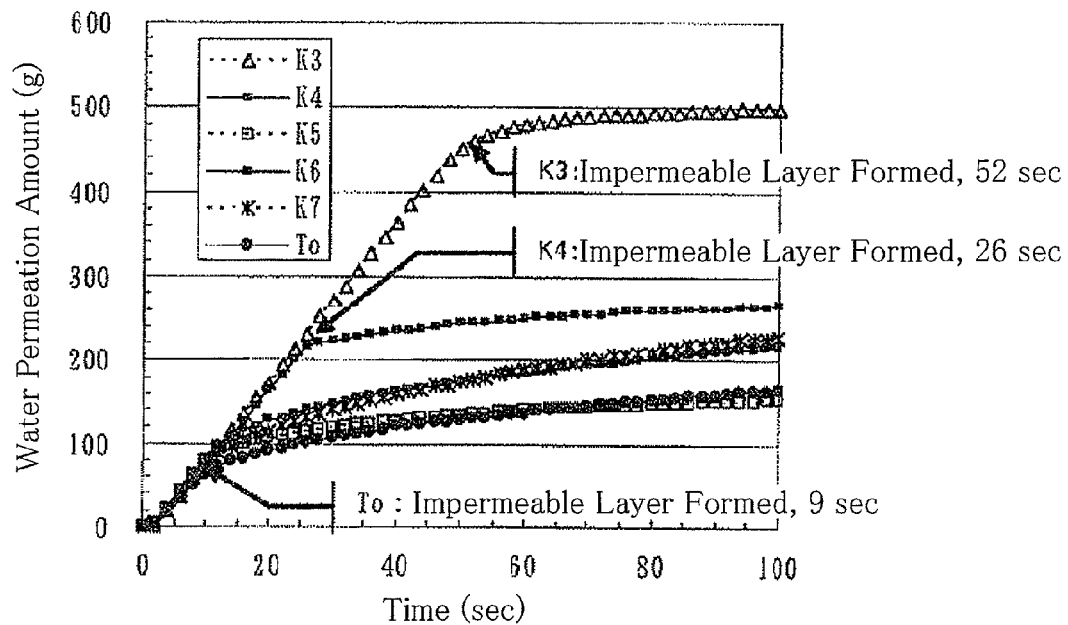
FIG. 7 is a result of checking the relationship between the water permeation amount in an air-foam stabilizer and a bentonite stabilizer and time.
Figure 8:
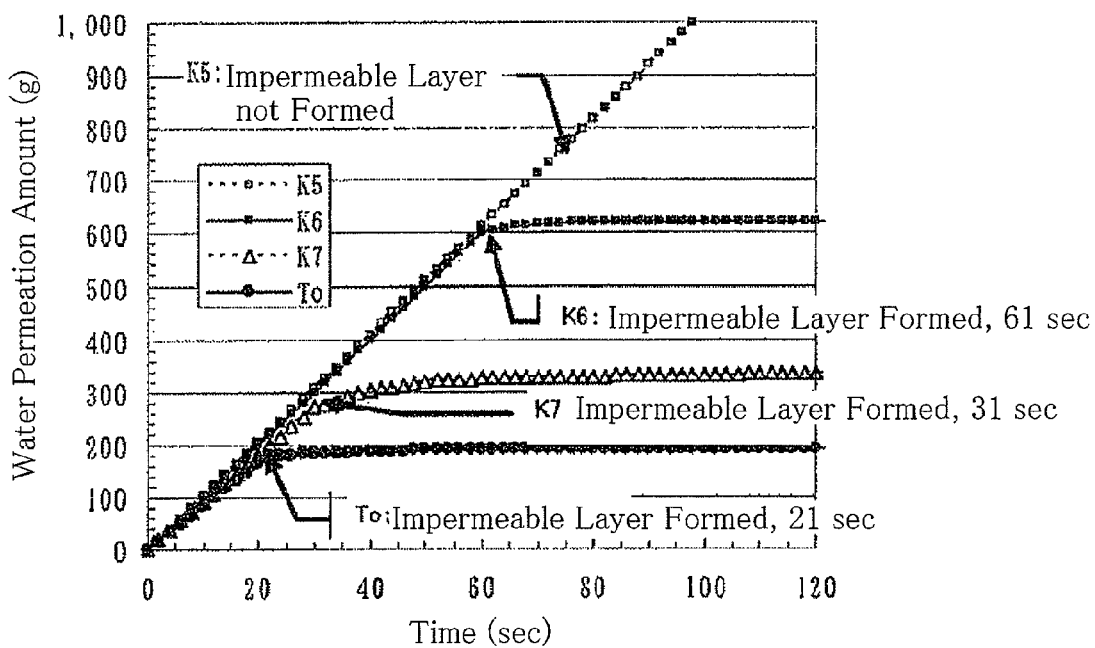
FIG. 8 is a result of checking the relationship between the water permeation amount in an air-foam stabilizer and a bentonite stabilizer and time.

FIG. 7 and FIG. 8 each show the relationship between the water permeation amount and the time with the air-foam stabilizer and the bentonite stabilizer; and Table 4 shows the time and the water permeation amount until impermeable layer formation. According to the relationship between the water permeation amount and the time obtained in the experiment, it is known that when the impermeable layer is formed, the water permeation amount rapidly decreases as in FIG. 7 and FIG. 8, and the water permeation speed is constant at a sufficiently small value. The time taken to reach the maximum curvature of the curve is the impermeable layer forming time as shown by the arrows in the drawings.

TABLE 4

Time and Water Permeation Amount until Impermeable Layer Formation

| | | Soil Sample | | | | | |
|---|---|---|---|---|---|---|---|
| | | Toyoura silica sand | silica sand No. 7 | silica sand No. 6 | silica sand No. 5 | silica sand No. 4 | silica sand No. 3 |
| Air-Foam Stabilizer | Time (sec) for Impermeable Layer Formation | 9 | 10 | 12 | 11 | 26 | 52 |
| | Water Permeation Amount (g) until Impermeable Layer Formation | 58 | 79 | 97 | 89 | 214 | 458 |
| Bentonite Stabilizer | Time (sec) for Impermeable Layer Formation | 21 | 31 | 61 | x | x | x |
| | Water Permeation Amount (g) until Impermeable Layer Formation | 172 | 273 | 602 | x | x | x |

Note 1:
x means no formation of impermeable layer.

Using the air-foam stabilizer, the water permeation amount in Toyoura sand, silica sand No. 7, silica sand No. 6 and silica sand No. 5 drastically reduced in about 10 seconds, that in silica sand No. 4 drastically reduced in 26 seconds, and that in silica sand No. 3 drastically reduced in 52 seconds; and after that, the water permeation speed became constant, or that is, an impermeable layer was formed. On the other hand, using the bentonite stabilizer, the water permeation amount in Toyoura sand drastically reduced in 21 seconds, that in silica sand No. 7 in 31 seconds and that in silica sand No. 6 in 61 seconds; and the water permeation speed became constant and an impermeable layer was formed; however, the water permeation amount did not reduce in silica sand No. 5, or that is, an impermeable layer was not formed. From these, it is judged that the air-foam stabilizer has the property of forming an impermeable layer within a shorter period of time than the bentonite stabilizer and can be applied to strata containing coarser gravels.

Table 5 shows the apparent water permeation coefficient (hydraulic gradient, i nearly equals to 2 (m)/0.1 (m)=20) obtained by dividing the water permeation speed after the impermeable layer formation by the cross section of the simulated soil. With the air-foam stabilizer, the apparent water permeation coefficient is on an order of $10^{-5}$ (cm/s), and with the bentonite stabilizer, the water permeation coefficient is on an order of $10^{-6}$ (cm/s); and these are smaller by at least 1000 times than the water permeation coefficient of the original ground.

TABLE 5

Apparent Water Permeation Coefficient with Air-Foam Stabilizer, Bentonite Stabilizer

| | Soil Sample | | | | | |
|---|---|---|---|---|---|---|
| | Toyoura sand | Silica sand No. 7 | Silica sand No. 6 | Silica sand No. 5 | Silica sand No. 4 | Silica sand No. 3 |
| Water Permeation Coefficient of Original Ground | $1.83 \times 10^{-2}$ | $1.75 \times 10^{-2}$ | $4.21 \times 10^{-2}$ | $6.62 \times 10^{-2}$ | $9.73 \times 10^{-2}$ | $9.13 \times 10^{-2}$ |

TABLE 5-continued

Apparent Water Permeation Coefficient with Air-Foam Stabilizer, Bentonite Stabilizer

Figure 9:
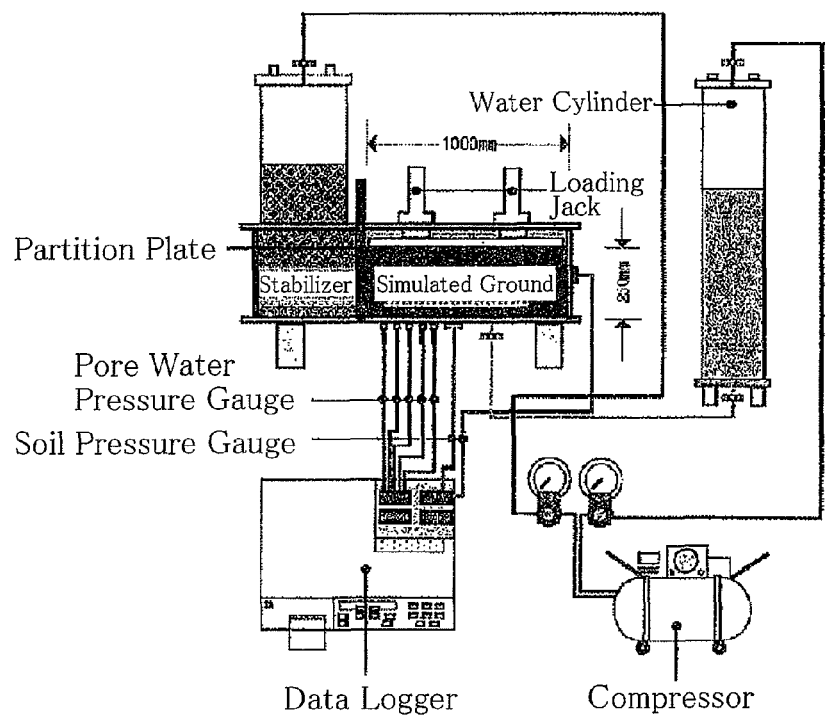
FIG. 9 is a view of an experimental apparatus used for checking the relationship between the stabilizer pressure and the water pressure in breakdown of a tunnel wall by gradually increasing the groundwater pressure inside a simulated soil relative to the tunnel wall kept stabilized by the liquid pressure through formation of an impermeable layer of the stabilizer.

| | Soil Sample | | | | | |
|---|---|---|---|---|---|---|
| | Toyoura sand | Silica sand No. 7 | Silica sand No. 6 | Silica sand No. 5 | Silica sand No. 4 | Silica sand No. 3 |
| Water Permeation Coefficient with Air-Foam Stabilizer | $1.81 \times 10^{-5}$ | $4.78 \times 10^{-5}$ | $7.42 \times 10^{-5}$ | $2.57 \times 10^{-5}$ | $1.45 \times 10^{-5}$ | $1.30 \times 10^{-5}$ |
| Water Permeation Coefficient with Bentonite Stabilizer | $2.58 \times 10^{-6}$ | $2.90 \times 10^{-6}$ | $3.39 \times 10^{-6}$ | Impermeable Layer not formed. | | | c) Relationship Between Stabilizer Pressure and Groundwater Pressure in Breakdown of Impermeable Layer:

With the assumption of a groundwater pressure larger than the stabilizer pressure in drilling, the relationship between the stabilizer pressure and the water pressure was investigated at the time of breakdown of a tunnel wall by gradually increasing the groundwater pressure inside the simulated soil relative to the tunnel wall kept stable owing to the liquid pressure through formation of an impermeable layer with the stabilizer, using an experimental apparatus shown in FIG. 9.

Soil samples were Toyoura sand, and silica sand No. 5 and silica sand No. 4 with which the formation of an impermeable layer is relatively difficult with a stabilizer. The stabilizer was prepared in the same manner as in the previous section. The water pressure in the simulated soil was measured with five pore water pressure gauges set in a space of from 5 to 25 cm from the tunnel wall face.

First, a soil sample was put into a simulated soil chamber and well tamped down therein to be in a saturated state. By the upper jack, an overburden stress pressure (9.8 to 29.4 kN/m$^2$) was applied onto the upper surface of the simulated soil. The stabilizer was put into the stabilizer cylinder, and an air pressure (19.6 to 39.2 kN/m$^2$) corresponding to the stabilizer pressure was applied to the inside of the cylinder.

Next, the partition plate partitioning the stabilizer and the simulated soil was gradually drawn off, taking a sufficient period of time of 5 minutes or more so as to form an impermeable layer. After the removal of the partition plate, pressurized water was fed to the simulated soil from the water cylinder for water supply. The pressurized water pressure was increased at a ratio of 9.8 kg/m$^3$ in 3 minutes. By confirming the continuing condition in which the mean value of the found data of the pore water pressure in the simulated soil could increase no more in at least 3 minutes after the pressurization, or by visually confirming the breakdown of the tunnel wall, the tunnel wall was considered to be broken down.

Figure 10:
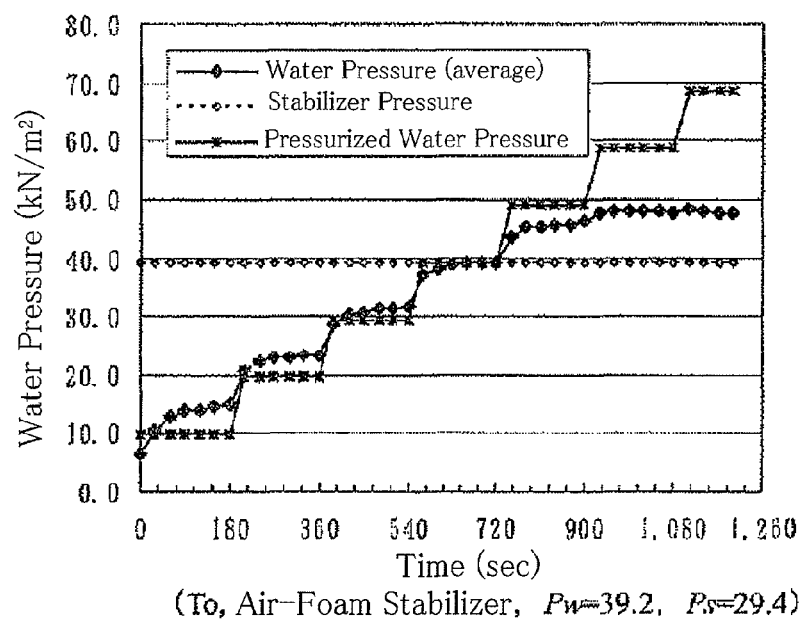
FIG. 10 is an experimental result of using an air-foam stabilizer and a bentonite stabilizer for a simulated soil of Toyoura sand, in which the stabilizer pressure, Pw=39.2 kN/m², and the overburden stress pressure, Ps=29.4 kN/m².
Figure 11:
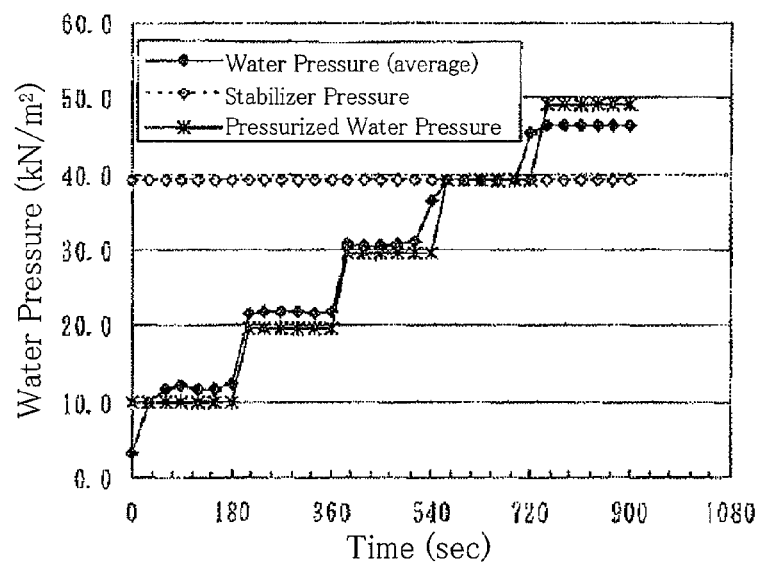
FIG. 11 is an experimental result of using an air-foam stabilizer and a bentonite stabilizer for a simulated soil of Toyoura sand, in which the stabilizer pressure, Pw=39.2 kN/m², and the overburden stress pressure, Ps=29.4 kN/m².

FIG. 10 and FIG. 11 each show the experimental result of using the air-foam stabilizer and the bentonite stabilizer for a simulated soil of Toyoura sand, in which the stabilizer pressure, Pw=39.2 kN/m$^2$, and the overburden stress pressure, Ps=29.4 kN/m$^2$. In FIG. 10 in which the air-foam stabilizer was used, the mean value of the pore water pressure in the simulated soil increased up to 14.9 kN/m$^2$ when the pressurized water pressure was 9.8 kN/m$^2$, but this is only about 40% of the stabilizer pressure 39.24 kN/m$^2$, or that is, it may be said that the stabilizer pressure fully acted on the soil via the impermeable layer and the tunnel wall was thereby stabilized. Afterwards, the pressurized water pressure was stepwise increased; and with that, the pore water pressure in the simulated soil monotonically increased within a range where the pressurized water pressure did not exceed over the stabilizer pressure, but when the pressurized water pressure reached higher than the stabilizer pressure, then the pore water pressure no more increased over the peak of 48.04 kN/m$^2$ higher than the stabilizer pressure by 8.84 kN/m$^2$. This is a state where the pore water in the simulated soil flowed into the stabilizer owing to the pressurized water, and this means the breakdown of the tunnel wall. In FIG. 11 where the bentonite stabilizer was used, the water permeability coefficient of the mud film was sufficiently small, the pore water pressure in the soil was almost equal to the pressurized water pressure in the range where the pressurized water pressure was smaller than the stabilizer pressure. However, when the pressurized water pressure was over the stabilizer pressure, then the pore water pressure in the soil no more increased over 48 kN/m$^2$ like the case of using the air-foam stabilizer, and it is judged that the tunnel wall broke down in this stage. In the case where silica sand No. 5 or silica sand No. 4 was used as the soil sample, the air-foam stabilizer could form the impermeable layer, however, the bentonite stabilizer could not form the impermeable layer and the tunnel wall broken down simultaneously with removing the partition plate.

Figure 12:
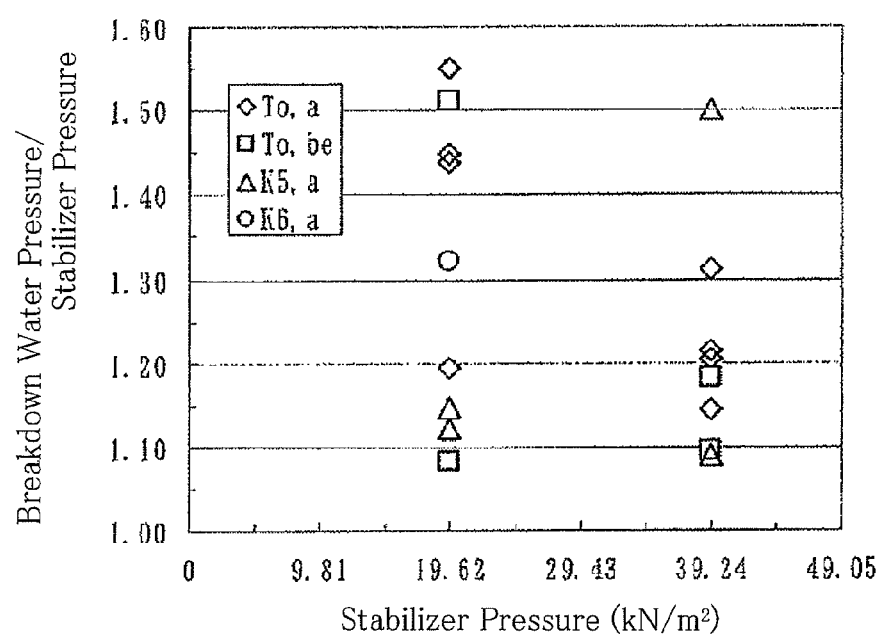
FIG. 12 is a ratio of the soil pore water pressure and the stabilizer pressure based on Table 6 showing the experimental result in wall breakdown.

Based on Table 6 showing the experimental results in wall breakdown, the ratio of the underground pore water pressure to the stabilizer pressure is shown in FIG. 12. With both the air-foam stabilizer and the bentonite stabilizer, the ratio of the breakdown water pressure to the stabilizer pressure was distributed within a range of from 1.1 to 1.5 irrespective of the stabilizer pressure; and it may be said that the air-foam stabilizer has the same performance as that of the bentonite stabilizer. In the explanatory notes to the drawing, a indicates the air-foam stabilizer and be indicates the bentonite stabilizer.

TABLE 6

Tunnel Wall Breakdown Test

| | | | | Wall Breakdown | | |
|---|---|---|---|---|---|---|
| Soil Sample | Stabilizer | Stabilizer Pressure (kN/m$^2$) | Overburden Stress Pressure (kN/m$^2$) | Breakdown Water Pressure (kN/m$^2$) | Pressurized Water Pressure (kN/m$^2$) | Time (sec) |
| Toyoura sand | air-foam | 19.6 | 9.8 | 28.4 | 29.4 | 440 |
| Toyoura sand | air-foam | 19.6 | 19.6 | 23.4 | 29.4 | 440 |

TABLE 6-continued

Tunnel Wall Breakdown Test

| | | | | Wall Breakdown | | |
| --- | --- | --- | --- | --- | --- | --- |
| Soil Sample | Stabilizer | Stabilizer Pressure (kN/m$^2$) | Overburden Stress Pressure (kN/m$^2$) | Breakdown Water Pressure (kN/m$^2$) | Pressurized Water Pressure (kN/m$^2$) | Time (sec) |
| Toyoura sand | air-foam | 19.6 | 29.4 | 30.4 | 39.2 | 720 |
| Toyoura sand | air-foam | 19.6 | 39.2 | 28.2 | 29.4 | 440 |
| Toyoura sand | air-foam | 39.2 | 9.8 | 47.2 | 58.8 | 940 |
| Toyoura sand | air-foam | 39.2 | 19.6 | 51.4 | 68.6 | 1160 |
| Toyoura sand | air-foam | 39.2 | 29.4 | 47.6 | 58.8 | 930 |
| Toyoura sand | air-foam | 39.2 | 39.2 | 44.9 | 44.9 | 780 |
| Toyoura sand | bentonite | 19.6 | 9.8 | 21.2 | 29.4 | 400 |
| Toyoura sand | bentonite | 19.6 | 29.4 | 29.6 | 39.2 | 570 |
| Toyoura sand | bentonite | 39.2 | 9.8 | 42.9 | 49.0 | 740 |
| Toyoura sand | bentonite | 39.2 | 29.4 | 46.3 | 49.0 | 740 |
| Silica sand No. 5 | air-foam | 19.6 | 19.6 | 22.0 | 39.2 | 580 |
| Silica sand No. 5 | air-foam | 19.6 | 39.2 | 22.5 | 29.4 | 520 |
| Silica sand No. 5 | air-foam | 39.2 | 19.6 | 58.8 | 59.9 | 980 |
| Silica sand No. 5 | air-foam | 39.2 | 39.2 | 42.7 | 49.0 | 900 |
| Silica sand No. 5 | bentonite | 19.6 | 19.6 | Impermeable layer not formed. | | |
| Silica sand No. 5 | bentonite | 19.6 | 39.2 | | | |
| Silica sand No. 5 | bentonite | 39.2 | 19.6 | | | |
| Silica sand No. 5 | bentonite | 39.2 | 39.2 | | | |
| Silica sand No. 4 | air-foam | 19.6 | 19.6 | 25.9 | 29.4 | 500 |
| Silica sand No. 4 | bentonite | 19.6 | 19.6 | Impermeable layer not formed. | | |

(4) Characteristics Relating to Drilling Performance of Air-Foam Stabilizer:

a) Factor of Governing the Fluidity of Air-Foam Stabilizer:

As the index indicating the fluidity relating to the drilling performance of the air-foam stabilizer, a funnel viscosity and a table flow value are used. The funnel viscosity of the bentonite stabilizer is an index of indicating the viscosity of the stabilizer alone; but the TF value can express the fluidity in a broader range containing the soil under drilling, and therefore, the TF value was employed here as the index of the fluidity of the air-foam stabilizer.

As the factors having an influence on the TF value, there may be mentioned the water content ratio, the air foam addition ratio, the specific surface area of the soil under drilling, the fine grain content ratio, and the liquid limit. Accordingly, the air foam addition ratio, the specific surface area, the fine grains content ratio and the liquid limit were selected as parameters, and the relationship between the TF value and the water content ratio was investigated.

Figure 13:
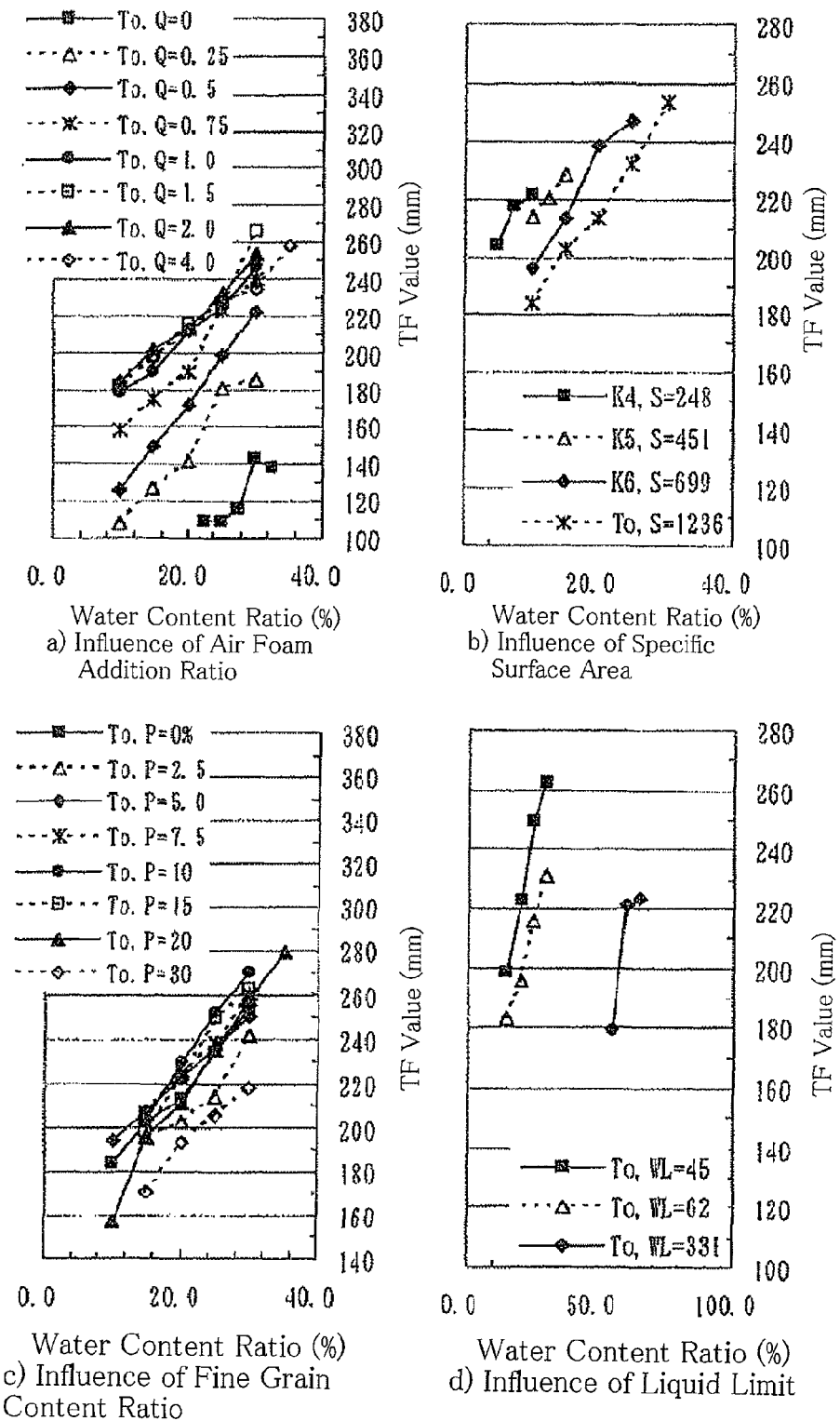
FIG. 13 is a view illustrating the relationship between the TF value and the water content ratio with parameters of a) air foam addition ratio, b) specific surface area, c) fine grain content ratio and d) liquid limit.

First, Toyoura sand was used as the soil sample, and the air foam addition ratio was set in 8 levels in a range of from 0 to 4%. Air-foam stabilizers were produced in which the water content ratio was varied for each level, and the TF value thereof was metered. The air foam addition ratio was used as the parameter, and the relationship between the TF value and the water content ratio is shown in FIG. 13-a).

Next, various types of silica sand were used as the sand samples, and air-foam stabilizers were produced with the air foam addition ratio Q=2.0% and with the water content ratio varied. The specific surface area was used as the parameter, and the relationship diagram between the TF value and the water content ratio was drawn as in FIG. 13-b).

Kaolin was added to Toyoura sand in 8 levels in a range of from 0 to 30%. Using the soil samples thus prepared, air-foam stabilizers were produced with the air foam addition ratio of 2%. The fine grain content ratio was used as the parameter, and the relationship diagram between the TF value and the water content ratio is shown in FIG. 13-c).

Similarly, for investigating the influence of clay minerals differing from each other in the consistency characteristic thereof on the TF value, kaolin, kibushi clay or bentonite was added to Toyoura sand to prepare samples. Using the samples with the air foam addition ratio=2.0%, the relationship between the TF value and the water content ratio is shown in FIG. 13-d).

FIGS. 13-a), b), c) and d) are referred to, in which it is known that the TF value is nearly proportionate to the water content ratio irrespective of the selected parameters, and the TF value can be represented by the formula (10).

$$TF = \alpha w + \beta \qquad \text{[Numerical Formula 10]}$$

wherein $\alpha$ and $\beta$ each are a coefficient.

Figure 14:
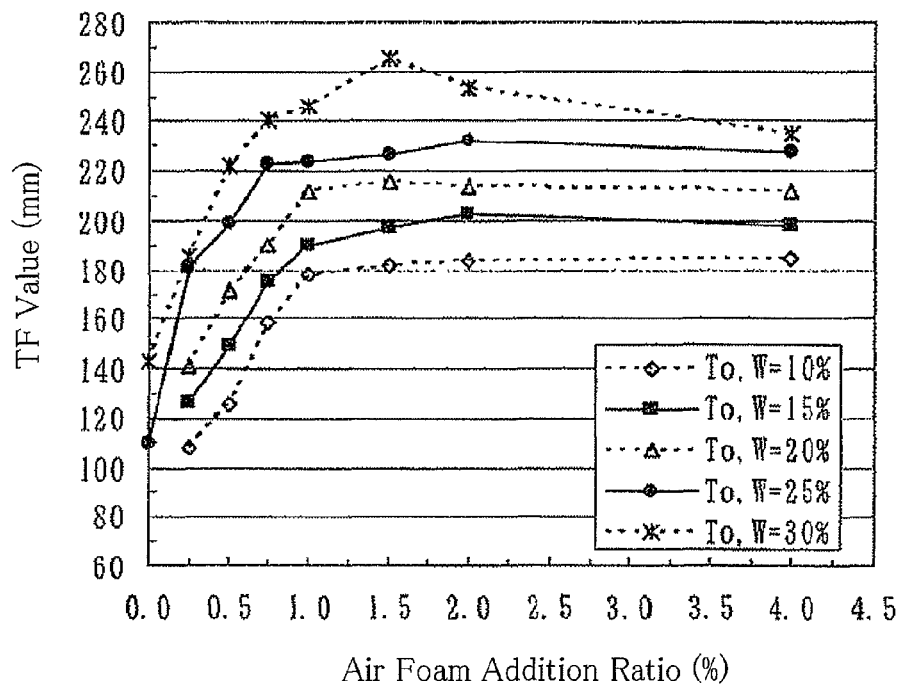
FIG. 14 is a result of redrawing FIG. 13-a) with a parameter of water content ratio, prior to determination of α and β.
Figure 15:
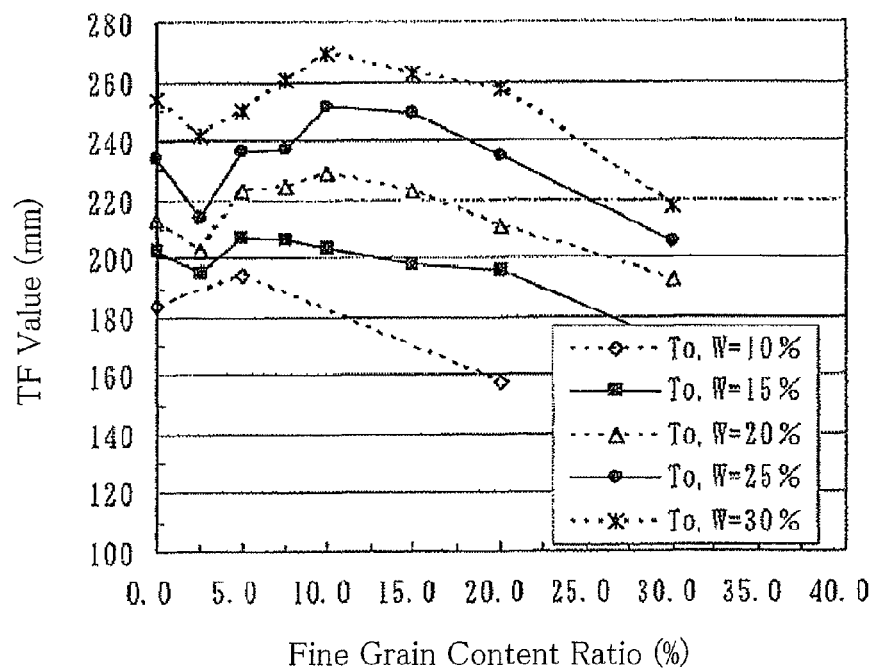
FIG. 15 is a result of redrawing FIG. 13-c) with a parameter of water content ratio, prior to determination of α and β.

Prior to determining $\alpha$ and $\beta$, FIGS. 13-a) and c) are redrawn with the water content ratio as the parameter, and they are FIG. 14 and FIG. 15, respectively. In FIG. 14, it is known that the TF value drastically increases with the increase in the air foam amount and is proportionate the air foam amount within the air foam addition ratio range of from 0 to 1%. However, when the air foam addition ratio is more than 1%, then the TF value no more changes but rather decreases slightly with the increase in the air foam addition amount. This may be because the air foams could enter the space between the soil grains to reduce the frictional force while the air foam addition ratio is up to 1%, but when the ratio is more than 1%, then there would be no contact between the soil grains. On the other hand, in FIG. 15, the TF value may increase within the kaolin content ratio is within a range of from 0 to 10%, but when the ratio is more than 10%, then the TF value decreases. This may be because, when the amount of the fine grains is small (at most 10%), then the grains may act as a lubricant material but when more than 10%, its action of retarding the fluidity owing to the increase in the viscosity may be larger than its lubricative action. Based on this fact, in determining α and β, the coefficients $\alpha_n$ and $\beta_n$ are determined individually in four regions where the fine grain content ratio P is at least 10%. or less than 10%, and the air foam addition ratio Q is at least 1%, or less than 1%. $\alpha_n$ and $\beta_n$ are influenced by the air foam addition ratio, the specific surface area, the fine grain content ratio and the liquid limit; and through multiple linear regression analysis with these as variables, the estimated formula with $\alpha_n$ and $\beta_n$ is shown in Table 7. The values of $\alpha_n$ and $\beta_n$ corresponding to the soil under drilling are assigned to the formula (10), and the TF value in each region can be thereby obtained.

Figure 16:
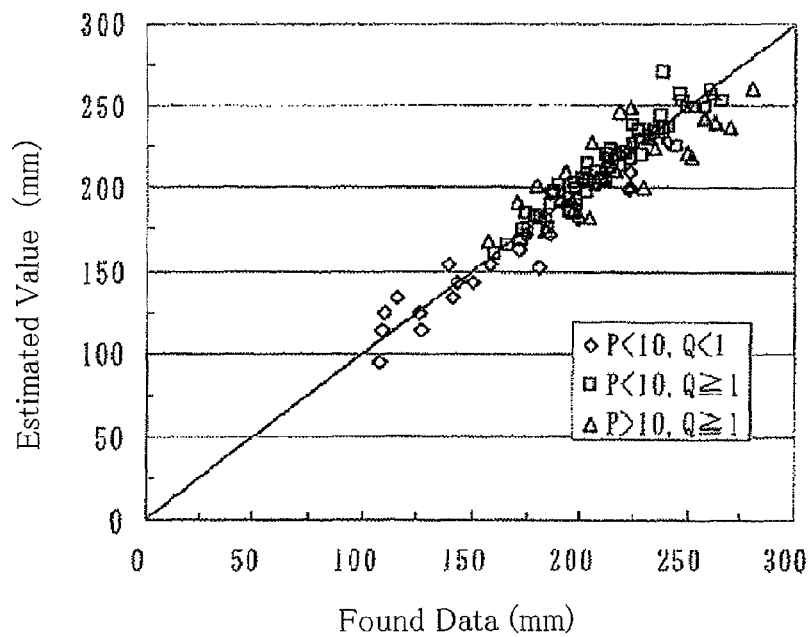
FIG. 16 is a result of comparison of the estimated TF value according to the formula (10) and the found TF value, in different regions.

The estimated data of the TF value thus obtained in the manner as above and the found data of the TF value are compared in different regions, as in FIG. 16. Accordingly, it is judged that, within the range of the TF value of from 100 (mm) to 300 (mm) that is meaningful in practical use, the TF value could be estimated based on the above-mentioned formula.

TABLE 7

Estimated Formula of $\alpha_n$ and $\beta_n$ in a case where the fine grain content ratio in the soil under drilling, P < 10

| Region 1 | Q < 1<br>P < 10 | $\alpha_1$: −0.78Q + 3.90<br>$\beta_1$: (0.817Q + 0.0180)(−0.0422S + 1.71P + 199) |
|---|---|---|
| Region 2 | Q ≧ 1<br>P < 10 | $\alpha_2$: −0.231Q − 0.00628$W_L$ + 3.86<br>$\beta_2$: −0.0422S + 1.71P + 199 | in a case where the fine grain content ratio in the soil under drilling, P ≧ 10

| Region 3 | Q < 1<br>P ≧ 10 | $\alpha_3$: 0.200Q + 3.90<br>$\beta_3$: (0.817Q + 0.180)(−0.0363S − 0.601$W_L$ + 196) |
|---|---|---|
| Region 4 | Q ≧ 1<br>P ≧ 10 | $\alpha_4$: −0.257Q + 0.00316$W_L$ + 4.10<br>$\beta_4$: −0.0363S − 0.601$W_L$ + 196 | b) Air-Foam Stabilizer Application Depth:

With the increase in the drilling depth, the air foams in the air-foam stabilizer would be compressed by the confined pressure whereby the basic properties of the air-foam stabilizers would change. As a result of experimental investigations, the inventors have confirmed that, within the range of the confined pressure of up to about 310 (kN/m$^2$) corresponding to the drilling depth of 30 m, the stabilizer could maintain the fluid properties. It may be presumed that the stabilizer could still maintain its function in some degree even under the confined pressure of more than the above, but it may be necessary to confirm it in actual construction works, etc.

2. Field Control Method with Air-Foam Stabilizer:

1) Control Items and Control Limits of Air-Foam Stabilizer:

Based on the experimental results relating to the physical properties and the basic performance of the air-foam stabilizer mentioned in the above, the following performance indices are specifically noted as the control items in field application of the air-foam stabilizer.

Fluidity of air-foam stabilizer relating to drilling.
Minimum water content ratio and separation water content ratio relating suspension stability of air-foam stabilizer.
Weight per volume and impermeable layer forming capability relating to stabilization of tunnel wall.

As the control indices to govern these performance indices, herein employed were the weight per volume γc and the TF value of the air-foam stabilizer, corresponding to the specific gravity and the funnel viscosity of the bentonite stabilizer. γc and the TF value could be both functions of the two variables of the air foam addition ratio Q and the water content ratio W of the air-foam stabilizer, when the physical data (P, S, $W_L$, γss, γsc) of the soil under drilling and the weight per volume of water and the air foams (γw, γb) are given thereto. Therefore, the limit values of Q and W are defined according to the following process; and based on these, the control chart for the air-foam stabilizer with γc and the TF value is formed.

(a) Control Limit Value Defined by Drilling Performance:

Regarding the fluidity of the air-foam stabilizer that governs the drilling performance, the control target of the TF value is from 150 to 200 mm in the TRD construction method. According to the result in the previous section, the TF value can be expressed by assigning $\alpha_n$ and $\beta_n$ in Table 7 to the formula (10) in the four regions n (=1, 2, 3, 4) where the fine grain content ratio is at least 10%, or less than 10%, and the air foam addition ratio Q is at least 1% and less than 1%; and therefore the control condition formula for the TF value is the following formula (11).

[Numerical Formula 11]

$$TF_n = \alpha_n w + \beta_n \geq 150 \quad (11)$$

In this, $TF_n$ means the TF value in the region n; $\alpha_n$ and $\beta_n$ each are the estimated formula of the region n in Table 7. The physical data of the soil under drilling are assigned to the estimated formula of $\alpha_n$ and $\beta_n$, whereby $\alpha_n$ is all the time a positive value and $\alpha_n$ and $\beta_n$ are in a primary expression of the air foam addition ratio Q. Accordingly, the case where the inequality expression is in equality is in the time when the water content ratio W of the air-foam stabilizer is the minimum water content ratio Wmin; and the value must be kept at least the air foam addition ratio computed with Wmin assigned to the formula. When the air foam addition ratio is the minimum air foam addition ratio Qmin, then the control limit for maintaining the TF value to be at least a predetermined control value is the minimum air foam addition ratio Qmin.

(b) Control Limit Value Defined by Suspension Stability of Stabilizer:

The water content ratio of the air-foam stabilizer must be kept larger than the minimum water content ratio (Wmin) of being the defoaming limit of air foams, and must be kept smaller than the separation water content ratio (Wsep) of being the separation limit; and therefore, the control limit relating to the suspension stability is represented by the formula (12).

[Numerical Formula 12]

$$Wmin \leq W \leq Wsep \quad (12)$$

Wmin and Wsep are represented by the formula (3) and the formula (8), and assigning the physical data (P, S, $W_L$) of the soil under drilling to these makes Wmin an invariable and makes Wsep a primary expression of Q. In general, the air-foam stabilizer may have a larger water content ratio when having a larger air foam addition ratio Q. The separation water content ratio Wsep is the minimum water content ratio at which soil grains separate; and therefore assigning Qmin as the value of Q enables computation of Wsep. Accordingly, the control limit values Wmin and Wsep relating to the suspension stability of the air-foam stabilizer are thereby determined.

[Numerical Formula 13]

$$W\min = 6.97 + 0.0403P \qquad (13)$$

[Numerical Formula 14]

$$w_{sep} = (0.0253S + 1.17Q + 1.07)\frac{100-P}{100} + W_L\frac{P}{100} \qquad (14)$$

(c) Control Limit Value Defined by Tunnel Wall Stability:

Regarding the tunnel wall stability, it is important to control it by the weight per volume of the air-foam stabilizer as so mentioned in the above. Since the control limit value counters the groundwater pressure, and therefore at least the weight per volume 10.3 ($kN/m^2$) corresponding to the specific gravity 1.05 in the control chart of the bentonite-base stabilizer could be the target level. The theoretical weight per volume of the air-foam stabilizer is represented by the formula (9) and the control condition is represented by the following formula (15).

[Numerical Formula 15]

$$\gamma_C = \frac{100+w+Q}{\frac{100-P}{\gamma_{ss}} + \frac{P}{\gamma_{sc}} + \frac{w}{\gamma_w} + \frac{Q}{\gamma_b}} \geq 10.3 \qquad (15)$$

Assigning the physical data ($\gamma ss$, $\gamma sc$, P) of the soil under drilling and the weight per volume of water and the air foams ($\gamma w$, $\gamma b$) to the formula (15) provides the following inequality expression of the water content ratio and the air foam addition ratio.

[Numerical Formula 16]

$$Q \leq a - bw \qquad (16)$$

In this, a and b each means a constant to be defined by the physical data of the soil under drilling, water and the air foams, and b is positive. The equality in this inequality expression is at the separation water content ratio (Wsep) of being the maximum water content ratio W allowable for the air-foam stabilizer, and the maximum value of the air foam addition ratio (=maximum air foam addition ratio Qmax) is thereby determined.

Regarding the order of computing the control limit values (Wmin, Wsep, Qmin, Qmax), the physical data of the soil under drilling are assigned to the formula (3), the formula (11), the formula (8) and the formula (13). With that, Wmin can be computed by the formula (3); then assigning Wmin to the formula (11) gives Qmin, this is assigned to the formula (8) to give Wsep, and this is assigned to the formula (12) to give Qmax.

Figure 17:
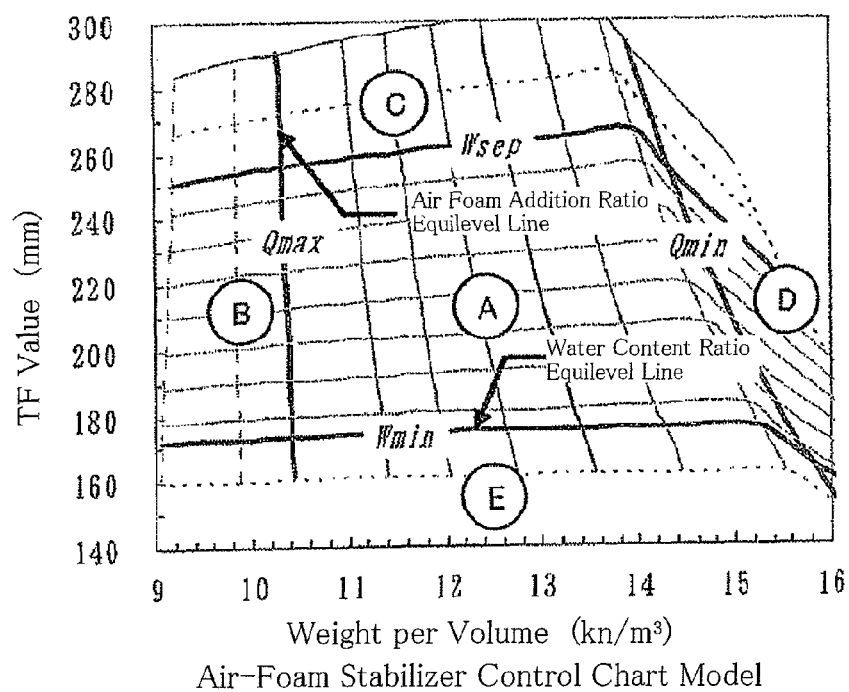
FIG. 17 is one example of an air-foam stabilizer control chart.

2) Formation of Control Chart of Air-Foam Stabilizer, and Method of Using it for Regulating Air-Foam Stabilizer:

For regulation and control of the bentonite stabilizer, used is the relational diagram of the specific gravity and the funnel viscosity of the bentonite stabilizer; and according to this, the air-foam stabilizer can be controlled and regulated by using an air-foam stabilizer control chart formed by plotting the control limits of the stabilizer, or that is, the minimum water content ratio Wmin, the separation water content ratio Wsep, the maximum air foam addition ratio Qmax, and the minimum addition ratio Qmin thereof on the relational diagram of the weight per volume $\gamma c$ and the TF value of the air-foam stabilizer. One example of the air-foam stabilizer control chart is shown in FIG. 17.

As described in the above, the weight per volume $\gamma c$ (formula (9)) and the TF value (formula (10) and Table 7) of the air-foam stabilizer are functions with Q and W as the parameters; and when, using a commercial spreadsheet, $\gamma c$ and the TF values are computed with the water content ratio kept constant and with the air foam addition ratio kept varying, and when these points are connected on the $\gamma c$-TF plane, then a water content ratio equilevel line can be drawn. Similarly, when $\gamma c$ and the TF values are computed with Q kept constant and with W kept varying and when these points are connected, then an air foam addition ratio equilevel line can be drawn. The inside region surrounded by the minimum water content ratio Wmin, the separation water content ratio Wsep, the maximum air foam addition ratio Qmax, and the minimum addition ratio Qmin in the thus-drawn water content ratio equilevel line/foam addition ratio equilevel line chart is the region that enables stable drilling with the air-foam stabilizer.

1) Utilization of Air-Foam Stabilizer Control Chart

The method of regulating the air-foam stabilizer by utilizing the air-foam stabilizer control chart shown in FIG. 17 may be summarized as follows:

<1> When the weight per volume and the TF value of the air-foam stabilizer are within the region of A, stable construction is possible.

<2> In the region of B, the weight per volume of the air-foam stabilizer is small and there is a risk of tunnel wall breakdown. When the condition of the air-foam stabilizer comes to the boundary between A and B, then the air foam addition amount is reduced and the weight per volume is increased.

<3> In the region of C, soil grains separate and precipitate; and near to the boundary between A and C, the water addition amount is reduced to prevent the separation and the precipitation.

<4> In the region of D, the TF value drastically becomes small, and the fluidity is lost; and near to the boundary between A and D, the air foam addition amount is increased.

<5> In the region of E, air foams disappear, and therefore, near to the boundary between A and E, the water addition amount is increased.

As in the above, regulation and control of the air-foam stabilizer in drilling can be attained by a combination of the air foam addition amount and the water addition amount.

3. Case of Production with Air-Foam Stabilizer with Cement Milk:

The method for regulation of an air-foam stabilizer of the invention of this application as above is described with respect to the case of producing the air-foam stabilizer by adding air foams and water to the soil under drilling; however in the invention of this application, the air-foam stabilizer with air foams and cement milk added to the soil under drilling can also be controlled and regulated quite similarly.

The details of this case are as follows:

(1) The cement milk is basically a mixture of cement and water. In this, in the cement milk, the ratio of water/cement (Wwc/Wc) may be a desired value in a range of from 0.6 to 4.0; and the range of use is, for example, such that the cement addition amount is from 50 to 400 $kg/m^3$ (per $m^3$) of the soil under drilling.

Cement is immediately set and hardened when mixed with water; but this hardening could be readily solved by mechanical stirring whereby the cement is restored to the unset condition. Cement setting should not occur within 1 hour under the standard; and therefore, the workability is not lost within 1 hour. Accordingly, in case where the air-foam stabilizer is composed of soil under drilling, air foams and cement milk, it may be considered that the stabilizer of the case could have the same property as that of the stabilizer with water added thereto, within 1 hour. When a setting retardant is added to cement milk, the time until the hardening of the cement may be prolonged.

(2) The grain size of cement is nearly within a range of from 6 to 9 µm, and when considered as soil grains, cement would correspond to silt of fine grain soil (5 to 75 µm). Accordingly, in case where cement milk is used in place of water, it may be considered as one substituted for silt of fine grains of the soil under drilling and water.

(3) In other words, in case where cement milk is used in place of water, it may be considered that, in the soil under drilling, silt is increased by the amount corresponding to the cement fraction of the cement milk and the water content is increased by the amount corresponding to the water content of the cement milk. This is made to be soil under drilling C.

(4) Regarding various conditional expressions in drilling with cement milk in place of water, for convenience sake, the physical data (S, $W_L$, P) and the air foam addition ratio Q of the soil under drilling, and the water content ratio W, the weight per volume γc, the minimum water content ratio Wmin, the separation water content ratio Wsep and the TF of the air-foam stabilizer are replaced with the physical data (Sc, $W_{Lc}$, Pc) and the air foam addition ratio Qc of the soil under drilling C, and the water content ratio Wc, the weight per volume γcc, the minimum water content ratio Wminc, the separation water content ratio Wsepc and the TFc of the air-foam stabilizer, respectively, and the conditional expressions are investigated below.

a) Mutual Relation of Symbols:

The mutual relation of the symbols between the case where the air-foam stabilizer is composed of soil under drilling, air foams and water (W), and the case where water is replaced with cement milk (C) are shown in Table 8; and the symbols for use in computation for the case where cement milk is used are shown in Table 9.

TABLE 8

| Factor | (W) | (C) | Remarks |
|---|---|---|---|
| Specific Surface Area of Coarse Grains ($m^2$/kN) | S | $S_C$ | There is no influence in changing to cement milk. $S = S_C$ |
| Liquid Limit of Soil under Drilling (%) | $W_L$ | $W_{LC}$ | The liquid limit is measured in the condition where a predetermined amount of cement is mixed. |
| Fine Grain Content Ratio (%) | P | $P_C$ | In changing to cement milk, this is computed according to the formula (15). |
| Air Foam Addition Ratio of Air-Foam Stabilizer (%) | Q | $Q_C$ | In changing to cement milk, this is defined according to the formula (20). |
| Water Content Ratio of Air-Foam Stabilizer (%) | W | $W_C$ | In changing to cement milk, this is defined according to the formula (22). |
| Weight per Volume of Air-Foam Stabilizer (kN/$m^3$) | $\gamma_C$ | $\gamma_{CC}$ | In changing to cement milk, this is defined according to the formula (23). |
| Minimum Water Content Ratio of Air-Foam Stabilizer (%) | $W_{min}$ | $W_{minC}$ | In changing to cement milk, this is computed according to the formula (24). |

TABLE 8-continued

| Factor | (W) | (C) | Remarks |
|---|---|---|---|
| Separation Water Content Ratio of Air-Foam Stabilizer (%) | $W_{sep}$ | $W_{sepC}$ | In changing to cement milk, this is computed according to the formula (25). |
| TF Value (mm) | $TF_n$ | $TF_{nC}$ | In changing to cement milk, this is computed according to the formula (30). |

TABLE 9

| Air-Foam Stabilizer | Weight (kg) | Volume ($m^3$) | Weight per Volume (kN/$m^3$) |
|---|---|---|---|
| Air Foams | $W_b$ | $V_b$ | $\gamma_b$ |
| Water Content of Soil under Drilling | $W_W$ | $V_W$ | $\gamma_W$ |
| Coarse Grains in Soil under Drilling | $W_{SS}$ | $V_{SS}$ | $\gamma_{SS}$ |
| Fine Grains in Soil under Drilling | $W_{SC}$ | $V_{SC}$ | $\gamma_{SC}$ |
| Water in Cement Milk | $W_{WC}$ | $V_{WC}$ | $\gamma_{WC}$ |
| Cement in Cement mill | $W_{CC}$ | $V_{CC}$ | $\gamma_{CC}$ |
| Total | W' | V' | γ' |

In replacing the symbols, the water/cement ratio in the cement milk is Wwc/Wc=x, the cement addition amount is Wc=y, and Wss+Wss=γd (dry density).

b) Liquid Limit $W_{Lc}$ (%):

For the liquid limit in the case of using cement milk, the value computed by mixing a suitable amount of cement in the fine grains of soil may be used.

c) Fine Grain Content Ratio Pc:

The fine grain content ratio P of the soil under drilling is represented by the following formula (17); and in the case of using cement milk, the fine grains are considered to increase, and the ratio Pc is represented by the formula (18).

[Numerical Formula 17]

$$P = \frac{W_{SC}}{W_{SS} + W_{SC}} \times 100 \tag{17}$$

[Numerical Formula 18]

$$P_C = \frac{W_{SC} + W_C}{W_{SS} + W_{SC} + W_C} \times 100 \tag{15}$$
$$= \frac{\gamma_d P + 100 y}{\gamma_d + y}$$

d) Air Foam Addition Ratio Qc (%):

From the definition of the above-mentioned formula (1), the air foam addition ratio is represented by the following formula (19), and therefore, in the case where cement milk is used, the ratio is represented by the formula (20) as the fine grains would increase.

[Numerical Formula 19]

$$Q = \frac{W_b}{W_{SS} + W_{SC}} \times 100 \tag{19}$$

-continued

[Numerical Formula 20]

$$Q_C = \frac{W_b}{W_{SS} + W_{SC} + W_C} \times 100 \qquad (20)$$

$$= \frac{\gamma_d Q}{\gamma_d + y} \times 100$$

e) Water Content Ratio Wc:

The water content ratio is represented by the following formula (21); and therefore, in the case where cement milk is used, the ratio is represented by the formula (22).

[Numerical Formula 21]

$$w = \frac{W_W}{W_{SS} + W_{SC}} \times 100 \qquad (21)$$

[Numerical Formula 22]

$$w_C = \frac{W_W + W_{WC}}{W_{SS} + W_{SC} + W_C} \times 100 \qquad (22)$$

$$= \frac{w\gamma_d + 100xy}{\gamma_d + y} \times 100$$

f) Weight per volume of stabilizer, $\gamma cc$ (kN/m$^3$):

The weight per volume of the air-foam stabilizer is represented by the above-mentioned formula (9); and therefore, the weight per volume γcc in the case where cement milk is used is represented by the following formula (23) with the weight of the cement milk and the weight of water added thereto.

[Numerical Formula 23]

$$\gamma_{CC} = \frac{W_{SS} + W_{SC} + W_C + W_{WC} + W_W + W_b}{V_{SS} + V_{SC} + V_C + V_{WC} + V_W + V_b} \qquad (23)$$

$$= \frac{100 + w + Q + \frac{100y}{\gamma_d}(1+x)}{\frac{100-P}{\gamma_{SS}} + \frac{P}{\gamma_{SC}} + \frac{w}{\gamma_W} + \frac{Q}{\gamma_b} + \frac{100y}{\gamma_d}\left(\frac{1}{\gamma_{CC}} + \frac{x}{\gamma_W}\right)}$$

In this, γd is the dry density (kN/m$^3$) of the soil grains and is known; and therefore, the weight per volume of the stabilizer can be computed by assigning the water/cement ratio x and the cement addition amount y of the cement milk to the above formula.

g) Minimum Water Content Ratio Wminc (%):

The minimum water content ratio is represented by the above-mentioned formula (13); and therefore, the minimum water content ratio in the case where cement milk is used is represented by the following formula (24) where Pc is substituted for P.

[Numerical Formula 24]

$$w_{minc} = 6.97 + 0.0403 P_C \qquad (24)$$

h) Separation Water Content Ratio Wsepc (%):

The separation water content ratio is represented by the above-mentioned formula (14); and therefore, the separation water content ratio in the case where cement milk is used is represented by the following formula (25) where Qc, Pc, $W_{Lc}$ are substituted for Q, P and $W_L$, respectively.

[Numerical Formula 25]

$$W_{sepc} = (0.0253S + 1.17Q_C + 1.07)\frac{100 - P_C}{100} + W_{LC}\frac{P}{100} \qquad (25)$$

i) Table Flow Value TFnc (mm):

The TF value is represented by the following formula (26); and therefore, the TFnc value in the case where cement milk is used may be computed according to the following formula (27) where αn and βn are replaced with αnc and βnc, respectively. αn and βn are functions of Q, S, P and $W_L$; and therefore, when αnc and βnc are computed using Qc, Sc (=S), Pc and $W_{Lc}$, then αnc and βnc are as in Table 10.

[Numeric Formula 26]

$$TF_n = \alpha_n W + \beta_n \qquad (26)$$

[Numeric Formula 27]

$$TF_{nc} = \alpha_{nc} W + \beta_{nc} \qquad (27)$$

TABLE 10

| | αnc, βnc |
|---|---|
| | Fine Grain Content Ratio in Soil under Drilling, P < 10 |
| Region 1 | $Q_c < 1$   $\alpha_{1C}$: −0.78Q + 3.90 |
| | $P_c < 10$   $\beta_{1C}$: (0.817Q + 0.180)(−0.0422S + 1.71P + 199) |
| Region 2 | $Q_c \geq 1$   $\alpha_{2C}$: −0.231Q − 0.00628$W_L$ + 3.86 |
| | $P_c < 10$   $\beta_{2C}$: −0.0422S + 1.71P + 199 |
| | Fine Grain Content Ratio in Soil under Drilling, P ≧ 10 |
| Region 3 | $Q_c < 1$   $\alpha_{3C}$: 0.200Q + 3.90 |
| | $P_c \geq 10$   $\beta_{3C}$: (0.817Q + 0.180)(−0.0363S − 0.601$W_L$ + 196) |
| Region 4 | $Q_c \geq 1$   $\alpha_{4C}$: −0.257Q + 0.00316$W_L$ + 4.10 |
| | $P_c \geq 10$   $\beta_{4C}$: −0.0363S − 0.601$W_L$ + 196 | j) Control Value Limit:

The control value limits are the following formulae (28) to (30).

[Numerical Formula 28]

$$w_{minc} \leq w_c \leq w_{sepc} \qquad (28)$$

[Numerical Formula 29]

$$\gamma_{cc} \geq 10.3 \qquad (29)$$

[Numerical Formula 30]

$$TF_{nc} \geq 150 \qquad (30)$$

As in the above, in the case where cement milk is used in place of water, it may be considered that, in the soil under drilling, silt is increased by the amount corresponding to the cement fraction of the cement milk and the water content is increased by the amount corresponding to the water content of the cement milk. Accordingly, the stabilizer can be controlled quite similarly. In addition, it is understood that the control limit values can be used with no change at all thereto.

In the above-mentioned description of the air-foam drilling work method of the invention of the present application, the verification is made using concrete values; and therefore the formulae and the tables include specific numerical values. In the method of the invention of the present application, these values may be used directly as they are; but needless-to-say, the method of the invention of the present application is not limited to these values.

Further, the air-foam drilling work method of the invention of the present application is characterized in that the air-foam stabilizer is regulated and the ground is drilled on the basis of the above-mentioned air-foam stabilizer regulation method. For the air-foam drilling work, typically exemplified are an underground continuous wall work method of preventing the breakdown of tunnel walls and facilitating the removal of sludge, a shield work method of filling the air-foam stabilizer between the cutter face of a shield propeller and the cutting face and in the chamber, and drilling soil with preventing the breakdown of the cutting face, etc.; but needless-to-say, the invention is not limited to these. As taken into consideration in these work methods, in solidifying the air-foam stabilizer in the field site, a defoaming material may be mixed in the solidifying material for increasing the strength of the solidified material.

EXAMPLES

Example 1

Construction of Soil-Cement Underground Continuous Wall with Air-Foam Stabilizer Based on the results in construction of a soil-cement underground continuous wall in a strongly-weathered tuff layer and in a Tenma gravel layer, using a TRD jigger with the air-foam stabilizer, the reasonability of the field control method for the air-foam stabilizer as invented in the previous section was verified.

(1) Drilling of Strongly-Weathered Tuff Layer:
1) Summary of Construction Work:
The work was as in the following Table 11.

TABLE 11

| | |
|---|---|
| Construction Site | Aomori Prefecture (2 construction zones) |
| Construction Method | soil-cement underground continuous wall construction according to TRD method |
| Construction Scale | construction length = 500 m, drilling depth (maximum) = 26 m, drilling width = 0.55 m |
| Soil Texture Constitution from Surface Layer | embankment; 0 to 1 m, volcanic silt; 1 to 3 m, strongly-weathered tuff (loam soil as a whole, and mixed with gravel); 3 to 16 m, weathered tuff (easily scratched with cutter); 16 to 28 m |
| Physical Data (mixed soil of layers) | weight per volume of coarse and fine soil grains = 27.1 kN/m3, 50% grain size of coarse grains = 0.00045 m, fine grain content ratio = 57%, liquid limit = 90% |

2) Construction Condition:
For construction control, the soil in the area for excavation was collected and tested for the physical properties and for the compounding with the air-foam stabilizer. In the compounding test, the air foam addition ratio was 1.0% for the purpose of reducing the amount of the sludge to be removed, and the air-foam stabilizer was produced with varying the amount of water added thereto.

Figure 18:
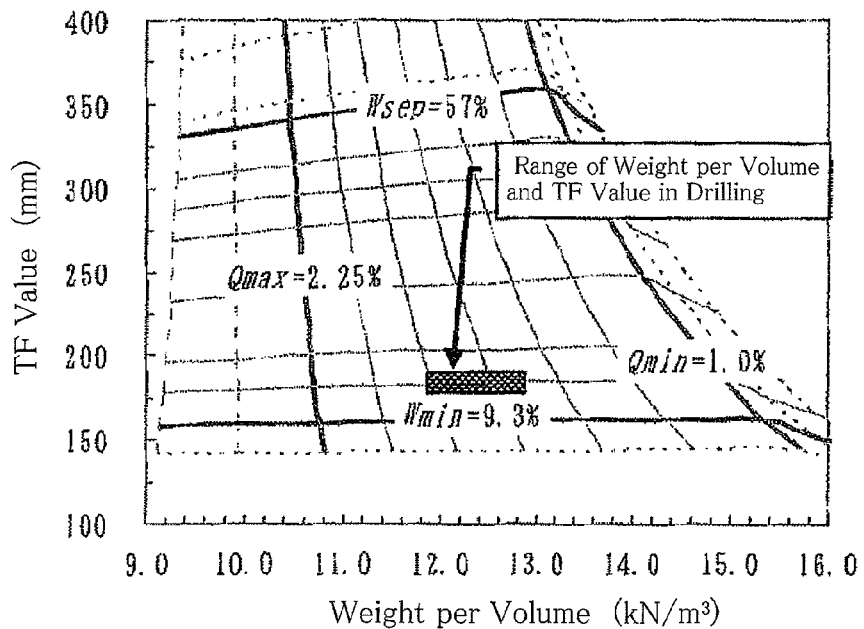
FIG. 18 shows a stabilizer control chart used in work, and the measured data of the weight per volume of the air-foam stabilizer and the TF value during work.

As a result, for the compounding ratio to attain the weight per volume=10.3 kN/m$^3$ and the TF value=180 mm, the air amount per m$^3$ of the soil under drilling was 0.305 m$^3$ (corresponding to air foam addition ratio=1.0%), and the water addition amount was 0.290 m$^3$ (in the second construction zone, 0.350 m$^3$). FIG. 18 shows a stabilizer control chart used for the construction, in which the range of the measured data of the weight per volume and the TF value of the air-foam stabilizer in construction was plotted. The construction enabled stable drilling without changing the first-set air foam amount and water addition amount; and the weight per volume of the air-foam stabilizer was stably from 11.8 to 12.8 kN/m$^3$ and the TF value thereof was from 185 to 200 nm.

3) Removed Sludge Amount:
Table 12 shows the drilled soil amount, the air foam addition amount and the water addition amount in drilling, and the removed sludge amount in drilling. The removed sludge amount is smaller than the amount of the air foams and water added, and this may be because the air foams would have been defoamed during soil-cement wall construction and the air-foam stabilizer would have penetrated into the tunnel wall. The amount of the sludge removed in drilling is computed according to the formula (31); and the mean value of the removed sludge amount in the two construction zones was 28.6%. As compared with the result, from 55 to 70%, in the case of using the bentonite-base stabilizer for the same soil texture, the result in this test case was at most ½ of the bentonite stabilizer-case result.

TABLE 12

Balance of Sludge Amount per m$^3$ of drilled soil

| Construction Zone | Drilled Soil Amount (m$^3$) | Added Amount (m$^3$) | | Sludge Amount removed in drilling (m$^3$) |
|---|---|---|---|---|
| | | Air Foams | Water | |
| First Construction Zone | 2,829 | 0.305 | 0.290 | 0.250 |
| Second Construction Zone | 2,059 | 0.305 | 0.350 | 0.321 |
| Average | 2,444 | 0.305 | 0.320 | 0.286 |

[Numerical Formula 31]

$$\text{Removed Sludge Ratio} = [(\text{removed sludge amount})/(\text{drilled soil amount})] \times 100 \quad (31)$$

Example 2

Application to Tenma Gravel Layer

1) Summary of Construction Work:
The work was as in the following Table 13.

TABLE 13

| | |
|---|---|
| Construction Site | Osaka Prefecture |
| Construction Method | soil-cement underground continuous wall construction according to TRD method |
| Construction Scale | construction length = 80 m, drilling depth = 26 m, drilling width = 0.55 m |
| Soil Texture Constitution from Surface Layer | embankment; 0 to 2 m, alternate layers of sand-mixed silt/silt-mixed sand layers; 2 to 12 m, gravel layer (Tenma layer); 12 to 28 m |
| Physical Data (mixed soil of layers) | weight per volume of coarse and fine soil grains = 26.5 kN/m3, 50% grain size of coarse grains = 0.00007 m, fine grain content ratio = 34.3%, liquid limit = 70% |

Figure 19:
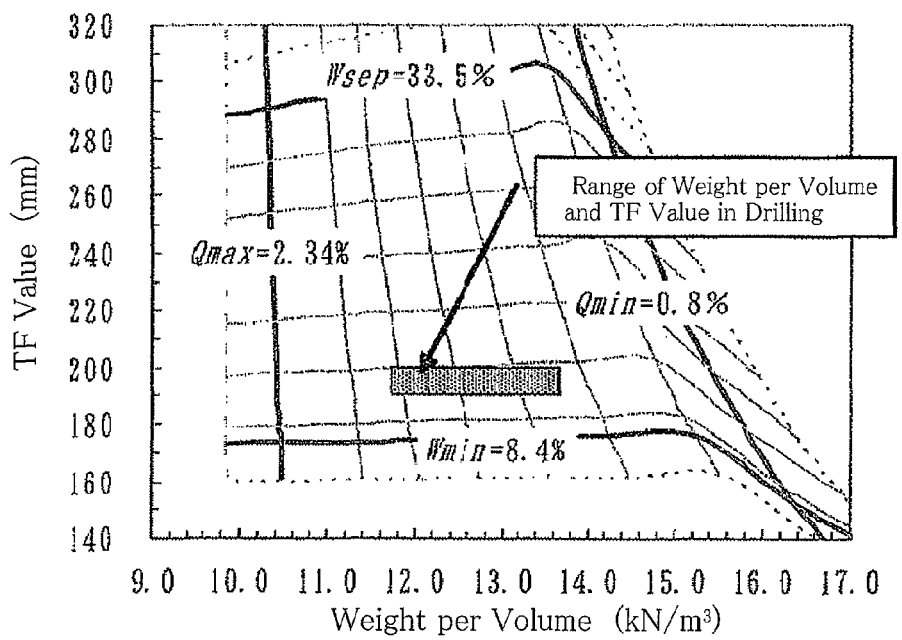
FIG. 19 is an air-foam stabilizer control chart used in the field, and the measured data of the weight per volume of the air-foam stabilizer and the TF value during work.

2) Construction Condition and Removed Sludge Amount:
The soil to be drilled was tested for the physical properties and for the compounding with the air-foam stabilizer. For the compounding ratio to attain the weight per volume of the air-foam stabilizer=10.3 kN/m$^3$ and the TF value thereof=180 mm, the air form addition amount was 0.391 m$^3$ (corresponding to air foam addition ratio=1.25%), and the water addition amount was 0.162 m³. FIG. 19 shows a control chart for the air-foam stabilizer used in the construction field, and the measured data of the weight per volume and the TF value of the air-foam stabilizer in construction. About ½ of the soil layer drilled in this construction field was a Tenma gravel layer; and therefore, as compared with that in the construction field in Aomori Prefecture in the previous section, the grain size of the soil layer was larger and the control latitude range for the water content ratio was narrower. However, the construction enabled stable drilling within the range of the weight per volume of the air-foam stabilizer of from 11.8 to 13.7 kN/m³ and within the range of the TF value thereof of from 190 to 200 nm. The removed sludge amount in drilling was about 170 m³, and this was 14.7% of all the drilled soil amount of 1140 m³. This was about ⅓ of the result value in the case of using the bentonite-base stabilizer in drilling the ground having the same soil texture.

As described in detail hereinabove, the basic performance of the air-foam stabilizer depends on the four factors of the defoaming water content ratio and the separation water content ratio relating to the suspension stability of the stabilizer and on the weight per volume and the TF value relating to the tunnel wall stability and the drilling performance. These four factors can be expressed by functions with variables of the physical data of the soil under drilling, the air foam addition ratio and the water content ratio.

Accordingly, in regulation of the air-foam stabilizer, the air foam amount and the water amount may be controlled with the following indices, as in the present invention.

Wmin: Defoaming water content ratio,
Wsep: Separation water content ratio,
Qmin: Minimum air foam addition ratio,
Qmax: Maximum air foam addition ratio.

As illustrated in FIG. 17 to FIG. 19, it is effective to regulate the air foam amount and the water amount to fall within the range surrounded by the curves of the above-mentioned indices Wmin, Wsep, Qmin and Qmax in the orthogonal X-Y two-dimensional correlation diagram of the density and the fluidity of the air-foam stabilizer.

Industrial Applicability

According to the invention, the control indices for drilling construction with an air-foam stabilizer have been clarified, and there are provided an air-foam stabilizer regulation method and a novel method for ground drilling, based on these.

Specifically, in the invention, the air-foam stabilizer that is defined as "a stabilizer of a homogeneous suspension of the soil under drilling, air foams and water or cement milk, excellent in tunnel wall stabilization and water shutoff capability and in fluidity in drilling" can be stabilized and regulated more surely and in a more simplified manner for actual construction work. Accordingly, the invention realizes high-quality and high-efficiency air form drilling work excellent in economical aspect.

The invention claimed is:

1. A method for regulating an air-foam stabilizer for ground drilling by adding air foams and water or cement milk to soil, having coarse and fine grains, under drilling and mixing them, wherein the air foam amount and the water or the cement milk amount are controlled for stabilization on the basis of the following indices:
<A>Defoaming water content ratio (Wmin) being the minimum water content at which when air foams are added to soil under drilling, defoaming would not occur,
<B>Separation water content ratio (Wsep) being the maximum water content ratio at which any separation would not occur in the air-foam stabilizer,
<C>Minimum air foam addition ratio (Qmin) being the minimum air foam addition amount from the viewpoint of the fluidity required for drilling, and
<D>Maximum air foam addition ratio (Qmax) being the maximum air foam addition amount for obtaining the necessary density of the air-foam stabilizer as the minimum density required for drilling,
and wherein,
the defoaming water content ratio Wmin is a percentage computed by dividing the sum of the water amount corresponding to the surface dry moisture state of the coarse grains contained in the soil under drilling, and the water amount corresponding to the shrinkage limit of the fine grains, by the dry weight of the coarse and fine solid grains, and is expressed as the linear function of the fine grain content ratio,
the separation water content ratio Wsep is a percentage computed by dividing the sum of the water amount corresponding to the separation water content ratio of the coarse grains contained in the soil under drilling, and the water amount corresponding to the separation water content ratio of the fine grains, by the dry weight of the coarse and fine solid grains, the separation water content ratio of the coarse grains is expressed as the linear function of the specific surface area of the coarse grains and the air foam addition ratio of the air-foam stabilizer, and the separation water content ratio of the fine grains is expressed as the liquid limit,
a table flow value is controlled as the function of the water content ratio W in the air-foam stabilizer, the air foam addition ratio Q, the specific surface area S of the coarse grains of the soil under drilling, the fine grain content ratio P in the soil under drilling, and the liquid limit $W_L$ of the fine grains of the soil under drilling, in every four regions where the fine grain content ratio P of the soil under drilling is at least 10%, or less than 10%, and the air foam addition ratio thereof is at least 1%, or less than 1%, and
the minimum air foam addition ratio (Qmin) is determined as the necessary air foam amount for maintaining the table flow value to be not lower than the control level when the water content ratio W in the air-foam stabilizer is the defoaming water content ratio (Wmin).

2. The method for regulating an air-foam stabilizer as claimed in claim 1, wherein in an orthogonal X-Y two-dimensional correlation diagram of the density and the fluidity of the air-foam stabilizer, the air foam amount, and the water or cement milk amount are controlled so as to fall within the range surrounded by the curves of the above-mentioned indices Wmin, Wsep, Qmin and Qmax.

3. The method for regulating an air-foam stabilizer as claimed in claim 2, wherein the density and the fluidity of the air-foam stabilizer are expressed by the weight per volume, $\gamma c$ of the air-foam stabilizer and the table flow value thereof.

4. The method for regulating an air-foam stabilizer as claimed in claim 1, wherein the weight per volume $\gamma c$ of the air-foam stabilizer is controlled as the function of the air foam addition ratio Q, the fine grain content ratio P, the water content ratio W of the air-foam stabilizer, the weight per volume $\gamma ss$ of the coarse soil grains, the weight per volume $\gamma sc$ of the fine soil grains, the weight per volume $\gamma w$ of water, and the weight per volume $\gamma b$ of the air foams, and the maximum air foam addition amount (Qmax) is determined as the necessary air foam amount for maintaining γc to be not lower than the control level along with the separation water content ratio Wsep.

5. The method for regulating an air-foam stabilizer as claimed in claim 1, wherein the cement milk has a water to cement ratio (W/C) of from 0.6 to 4.0.

6. An air-foam drilling work method comprising:
drilling a ground; and
during the drilling, adding the air-foam stabilizer to the ground and regulating the air-foam stabilizer according to the method of claim 1.

7. The air-foam drilling work method as claimed in claim 6, wherein the drilling of the ground is an underground continuous wall work method of preventing breakdown of tunnel walls and facilitating sludge removal.

8. The air-foam drilling work method as claimed in claim 7, wherein in solidifying the air-foam stabilizer, a defoaming material is mixed in the solidifying material for increasing the strength of the solidified material.

9. The air-foam drilling work method as claimed in claim 6, wherein the drilling of the ground is a shield work method of filling the air-foam stabilizer between the cutter face of a shield propeller and the cutting face and in the chamber, and drilling the ground with preventing the breakdown of the cutting face.

* * * * *